United States Patent Office 3,709,878
Patented Jan. 9, 1973

3,709,878
8 ALPHA-METHYL-SUBSTITUTED-STEROIDS
Eugene E. Galantay, Morristown, N.J., assignor to
Sandoz-Wander, Inc., Hanover, N.J.
No Drawing. Filed July 20, 1970, Ser. No. 56,743
Int. Cl. C07c 173/10
U.S. Cl. 260—239.55                    12 Claims

ABSTRACT OF THE DISCLOSURE 8 alpha-methyl-substituted steroids, e.g., 3-methoxy-8 alpha-methylestra-1,3,5(10)-trien-17β-ol, are useful as pharmaceutical agents, and are obtainable from 7,7-dihalo-cyclo[6α,7aα]-B-homogona-1,3,5(10)-trienes.

This invention relates to steroids, and more particularly to certain steroids having an 8 alpha-methyl substituent. This invention also relates to procedures for preparing such compounds, as well as to intermediates in the preparation thereof. This invention also relates to compositions containing such steroids and to the use thereof.

The final compounds of this invention may be conveniently represented by the formula

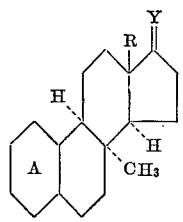

I wherein

R is alkyl having from 1 to 3 carbon atoms;
Y is oxo or the function

wherein

R¹ is a hydrogen atom or lower acyl; and
Q is a hydrogen atom, lower alkyl, lower cycloalkyl, lower alkenyl, lower alkynyl, lower halo-alkynyl or propadienyl; and Ring A is a member of the group consisting of the A structures:

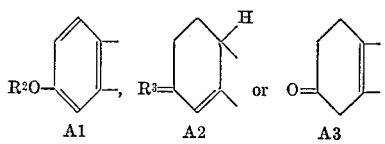

wherein

R² is a hydrogen atom, lower alkyl or lower acyl; and
R³ is oxo or the group

wherein R² is as defined above

In the above presented definitions, it is understood that the term lower alkyl includes those alkyl groups having from 1 to 4 carbon atoms; that the terms lower acyl, lower alkenyl and lower alkynyl include such groups having from 2 to 4 carbon atoms; and that with respect to such above-enumerated terms, isomeric forms are understood to be included where they exist with respect to configuration of carbon atoms as well as location of unsaturated positions; that the term lower halo-alkynyl includes such groups having from 2 to 4 carbon atoms and having a terminal trifluoromethyl group or a terminal halogen atom having an atomic weight of from 19 to 80, i.e., a fluoro, chloro or bromo atom; and that the term lower cycloalkyl includes such groups having from 5 to 7 ring carbon atoms. Representative of the above-described groups are methyl, ethyl, propyl, butyl, acetyl, propionyl, butyryl, vinyl, allyl, methallyl, ethynyl, propynyl, butynyl, fluoroethynyl, chloroethynyl, bromoethynyl, trifluoropropynyl, cyclopentyl, cyclohexyl and cycloheptyl groups.

Particularly valuable Compounds I are 3-alkoxy-8α-methylgona-1,3,5(10)-trien-17-ones, i.e., compounds of the Formula Ia,

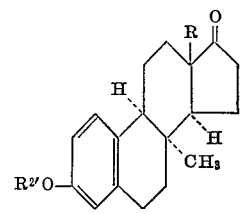

Ia wherein R is as defined above and R²′ is the same as R² when it is lower alkyl.

It will be readily appreciated that Compounds Ia may serve as intermediates for the remaining Compounds I, by carrying out one or more conversions as necessary, said individual conversion steps being per se conventional and well known in the chemical art. For example, reduction of the 17-oxo group yields the 17-hydroxy-substituted analog which may be subjected to a Birch reduction to convert the aromatic Ring A (type A1) thereof to a 3-alkoxy-2,5(10) unsaturated ring, which upon treatment with aqueous acid undergoes cleavage-rearrangement to yield a corresponding compound having either an A2 or A3-type Ring A, depending upon the particular conditions employed, as is well known in the art.

Various of the hydrocarbon or halo-hydrocarbon radicals may be introduced as the substituent Q, by treating a Compound Ia with an appropriate organo-metallo reagent, e.g., a Grignard reagent, to obtain an intermediate alcoholate salt which upon hydrolysis yields the corresponding 17α-Q, 17β-OH compound. If desired, such compound may then be acylated by conventional techniques to obtain a Compound I wherein R¹ is lower acyl.

A Compound I wherein R² is alkyl may be subjected to ether cleavage conditions (acid hydrolysis) in the conventional manner, e.g., by heating the compound with lithium iodide or pyridine hydrochloride when Y is oxo at temperatures of from about 100° to 200° C., preferably about 180° C. to obtain the 3-OH analog, which may then be acylated, if desired to obtain a Compound I wherein R² is lower acyl. Conversely, a Compound I having a 3-hydroxy group may be etherified by conventional means to obtain a Compound I wherein R² is lower alkyl.

Reduction of an oxo group at the 3- or 17-position may be achieved by conventional techniques, and oxidation of a

system may likewise be achieved by conventional techniques.

It will be readily apparent to those skilled in the art that certain of the above-described processes while directed at a particular site of the steroidal compound substrate, will also involve undesirable concomittant reactions at another site. For example, if a 17-keto-3-lower alkanoyloxy group-containing Compound I is treated with an organometallo reagent so as to obtain a Compound I which is 17β-hydroxy 17α-hydrocarbon-substituted, it will be appreciated that the 3-position will be effected by the reaction conditions, i.e., basic hydrolysis will occur causing conversion of the 3-alkanoyloxy to a 3-hydroxy group. Similarly, if a 17-keto group is present when a Birch reduction is carried out, then such group will be reduced to a hydroxy group. Accordingly, it will be appreciated that such potentially undesirable reactions should be taken into account when carrying out a particular procedure or reaction step. Compounds may be employed which have positions stable under the particular reaction conditions, for example, labile hydroxy groups may be "protected" or "masked" in the conventional manner, e.g., by employment as base-stable tetrahydrofuran-2-yl or tetrahydropyran-2-yl groups which may be cleaved at a latter stage to yield hydroxy groups. Similarly, a keto group may be "protected" in the form of an ethylenedioxy group.

The above-mentioned conversions of Compounds Ia to other Compounds I, and interconversions between various Compounds I is described in further detail below.

Compounds I bearing a hydroxy group at any of positions 3- and 17- may be acylated to obtain those Compounds I wherein any of $R^1$ and $R^2$ is lower acyl. Such acylations may be effected by processes known per se for the acylation of steroidal alcohols. With respect to compounds of Class I having two hydroxy groups, it will be noted that, a hydroxy group at the 3-position is phenolic and a hydroxy group at the 17β-position is secondary or tertiary. As one skilled in the art will be aware, the ease of acylation is secondary≅phenolic>tertiary and the ease of resaponification is clearly phenolic>secondary>tertiary. Accordingly, acylating agents and the stringency of acylating conditions can be chosen depending on the degree of acylation required employing conventional techniques. Suitable acylating agents for the 3-positions include acids, acyl halides and acid anhydrides of formulae acyl-OH, acyl-Hal and (acyl)$_2$O, respectively, wherein acyl is as defined above for $R^1$ or $R^2$ and Hal signifies bromine or chlorine, and mixtures thereof. Where the desired acyl moiety is acetyl, a preferred acylating agent is acetic anhydride. In carrying out the acylation, inert solvent may be employed or excess acylating agent may serve as solvent. An acid-binding agent, e.g., pyridine, is preferably used. Preferred temperatures vary between −10° and 50° C. For acylation of both positions, more stringent conditions may be used, characterized by the presence of a strongly acidic catalyst, e.g., p-toluenesulphonic acid, perchloric acid and the like. If such catalysts are used, in addition to the above-listed acylating agents, enol acylates, preferably esters of "isopropenyl alcohol," e.g., isopropenyl acetate, may also be employed. The considerations involved are well within the scope of one skilled in the art.

Furthermore, the diester form of Compound I may be selectively saponified employing conventional means, e.g., by treatment with methanolic potassium bicarbonate, to obtain the corresponding 3-hydroxy-17β-acyloxy-substituted Compound I. Hence, one skilled in the art can use such knowledge to obtain the desired combination of free hydroxy and acylated positions.

Compounds I wherein Y is oxo may be obtained by oxidizing the analog thereof wherein each of $R^1$ and Q are hydrogen atoms. The oxidation procedure may be carried out by conventional means for oxidizing a secondary hydroxy function to a carbonyl function, e.g., by use of chromium trioxide in pyridine or in acid such as acetic acid.

Conversely, when it is desired to convert a carbonyl containing Compound I to a hydroxy containing compound (at position 17, or at position 3- when A=A2 and $R^3$=oxo), then reduction can be carried out in a conventional manner for reducing a carbonyl function to a hydroxy function, e.g., using a hydride reagent, such as lithium aluminum hydride or sodium borohydride, in an inert solvent such as diethyl ether, diglyme, a lower alkanol, e.g., ethanol, or methylene chloride at a low temperature, e.g., from −50° to +10° C.

The above-mentioned Birch reduction may be carried out by use of a light metal, e.g., lithium, sodium or potassium in liquid ammonia, in the presence of a proton donor, the ammonia serving conveniently as the reaction medium, the temperature and pressure being controlled so as to maintain the ammonia in liquid state. Preferably, the reaction is performed under atmospheric pressure at a temperature of from −70° to −30° C. and preferably at the reflux temperature of ammonia (under one atmosphere). Suitable proton donors include lower alkanols, e.g., t-butanol and ethanol. If desired, inert organic solvent may be included in the reaction mixture, e.g., an ether, such as tetrahydrofuran.

The above-mentioned cleavage-rearrangement of a suitable compound having a 3-alkoxy-2,5(10) unsaturated A-Ring, to a compound wherein Ring A is of the A2-type, may be achieved by employment of vigorous conditions, i.e., the reaction may be conveniently carried out in a strongly acidic aqueous medium, i.e., at a pH value of less than 3 and preferably from 1 to 2. Alternatively, the process may be carried out under milder acidic conditions, for example, at a pH value of from 3 to 4, over a relatively prolonged period, for example, in excess of 3 hours.

Sulphuric acid, p-toluene sulfonic acid, hydrochloric acid or oxalic acid may conveniently be used to provide the strongly acidic conditions; and oxalic acid or acetic acid to provide the milder acidic conditions.

The process may be carried out at temperatures of from, for example, 0° to 100° C. preferably from 20° to 70° C. The reaction is suitably carried out in an inert water-miscible organic solvent, preferably a lower alcohol such as methanol. Where an organic acid, suitable as a solvent under the reaction conditions is employed, the reaction is suitably carried out in an excess thereof.

A compound having an A3-type A-Ring can be obtained by treating a 3-alkoxy-2,5(10)-unsaturated compound under the milder acidic conditions, described above.

A compound having a A3-type A-Ring may be converted to its analog having an A2-type A-Ring by acidic-rearrangement process, by employing the "vigorous" conditions described above, except that aqueous conditions are not essential, nor need the solvent be water-miscible. Alternatively, it may be carried out in a basic medium, for example, employing aqueous sodium or potassium hydroxide, preferably at a concentration of from about 0.01 N to about 2 N. The basic rearrangement is suitably effected in an inert organic solvent such as dioxane, methanol or ethanol. The reaction may be performed at a temperature of, for example, 20° to 120° C., preferably at the reflux temperature of the reaction medium. Suitable reaction times vary, for example, from about ¼-hour to about 6 hours. It is preferred, however, that the solvent of the rearrangement process be water-miscible.

Compounds bearing the protected keto or hydroxy functions may be prepared in the conventional manner. For example, dihydrofuran or dihydropyran may be reacted with the hydroxy-substituted compound to be protected, in the presence of an acidic catalyst, such as p-toluene sulfonic acid or phosphorous oxychloride, water being excluded from the reaction, to obtain the tetrahydrofuran-2-yloxy or tetrahydropyran-2-yloxy derivative respectively. Conversely, the protecting group may be removed as desired by conventional means, such as by the ether-cleaving conditions described above, in connection with cleavage-rearrangement. Similarly, etherification of a 3-OH function to a lower alkyl as described for $R^2$ above, may be carried out by conventional means for the etherification of a phenolic hydroxy group, e.g., by heating e.g., at 60° to 100° C. in the presence of a suitable alkyl iodide under basic conditions in a suitable solvent, e.g., an alkanol (the alkyl portion of which is preferably the same as that of the alkyl iodide). The basic conditions may be provided by anhydrous potassium carbonate.

As mentioned above, those compounds wherein $R^1$ is a hydrogen atom and Q is of the hydrocarbon or halohydrocarbon type, may be prepared from Compounds Ia.

A general method for preparing such compounds is to react a suitable Compound Ia at the 17-carbonyl function thereof with a suitable organo-metallo reagent, $$Q'—A$$

wherein Q' has the same meaning as Q defined above except excluding a hydrogen atom or a propadienyl group, and A is an active metal or active metal-containing ion, to form an intermediate salt which is then hydrolyzed to obtain the corresponding compound wherein the 17-position bears β-hydroxy and Q' substituents. A, may be for example, an alkali metal or a magnesium iodide or bromide.

The selection of the organo-metallo reagent is dependent on the specific type of Q' substituent desired. The selection of a particular reagent and use thereof by well-known methods is within the skill of persons skilled in the art.

For example, where the organic radical is alkyl or alkenyl, then A is preferably lithium or a magnesium-iodide or bromide moiety; where the organic radical is alkynyl then A is preferably an alkali metal, such as lithium, sodium or potassium. Such reagents are either known and may be prepared by known means, that is, by means as described in the literature or where not known may be prepared in a manner analogous to that used to prepare known compounds. Many such organo-metallo reagents are commercially available.

The reaction of the Compound Ia and the organo-metallo reagent may be carried out in the conventional manner, e.g., at a temperature of from about —80 to +60° C. and preferably from about —50 to +30 C. in anhydrous aprotic medium suitable for reactions involving an organo-metallo reagent, e.g., an ether such as tetrahydrofuran. The hydrolysis of the reaction product (the corresponding intermediate salt) may be carried out in the manner conventionally used in hydrolyzing Grignard adducts, for example, in an aqueous medium, e.g., by water or a highly concentrated aqueous solution of ammonium chloride or dilute aqueous acidic or alkaline solution.

Compounds I wherein Q is propadienyl, i.e., Compounds Ip, may be prepared from suitable Compounds Ia or suitable analogs thereof, by a process which is known to the art. Briefly, a compound wherein $R^1$ is a hydrogen atom and Q is propadienyl, may be obtained by preparing a quaternary ammonium salt (Compound Ip1), from a suitable 17β-hydroxy, 17α-[N,N-di(lower) alkylaminopropynyl]-substituted steroid, i.e., a Compound Ip2 and reduction of the salt to form the Compound Ip. The reactions are illustrated in the Reaction Scheme A, below wherein only the D rings of the compounds are shown as it is intended that these reactions occur only at the D-ring, R being as defined above and R', R'', R''' and X being defined below.

REACTION SCHEME A

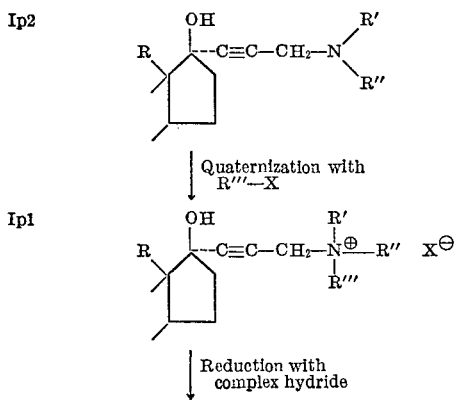

In Reaction Scheme A, each of R', R'', and R''' is, independently, lower alkyl, e.g., having from 1 to 3 carbon atoms, such as methyl, ethyl, n-propyl and iso-propyl; R' and R'' may be joined to form, in conjunction with the nitrogen atom, a ring having from 4 to 6 carbon atoms, such as a pyrrolidino or piperidino group; and X is a monovalent ion of a halogen atom having a molecular weight of from 35 to 127; i.e., chloro, bromo or iodo, or the anion of an organic sulfonic acid, such as mesylate ion, tosylate ion or the like.

The quaternization of a Compound Ip2 may be carried out in the conventional manner, e.g., in a suitable solvent, such as acetone, at a temperature of from —20° to +30° C.; neither the solvent nor the temperature conditions being critical. Preferably, R', R'' and R''' are the same, and it is particularly preferred they are all methyl. A preferred quaternizing agent (R'''—X) is methyl iodide.

The reduction of a Compound Ip1 may be carried out using a complex hydride, such as lithium aluminum hydride, in an inert organic solvent, e.g., diethyl ether or tetrahydrofuran, e.g., at a temperature of from —80° to +80° C.; neither the solvent nor the temperature conditions being critical.

Compounds Ip2 may be obtained by known means, e.g., condensation of a 17-carbonyl steroid with an organo-metallo reagent containing a [N,N-di(lower) alkylaminopropynyl] moiety or by carrying out a Mannich reaction with a suitable 17β-OH, 17α-ethynyl substituted-steroid and a suitable di(lower)alkylamino-methanol.

It will be appreciated by those skilled in the art that in preparing a Compound Ip, that regard should be given to the avoidance of undesired effects at other sites on the molecule during the enumerated reaction step. For example, any 3-keto group would be effected, and therefore it is advisable to use either a protected group or "protected structure," i.e., a structure which is stable under the reaction conditions but can later be easily modified to a desired form. For example, a compound having a 3-alkoxy-2,5(10)-unsaturated A ring can be employed as the intermediate when a final product having an A2 or A3 structure is desired.

A particular class of compounds which are related to Compounds Ia and may be readily converted to Compounds Ia or other Compounds I, are Compounds Ib,

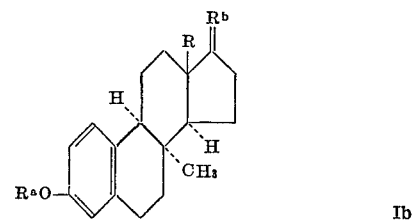

wherein R is as defined above, $R^a$ is either $R^2$ when it is lower alkyl; or a protective group for a hydroxy function, and $R^b$ is a group which is stable under hydrogenation conditions, but is readily converted to oxo, e.g., a ketal group, such as ethylenedioxy, or

wherein $R^c$ is a protective group for a hydroxy function and $R^d$ is the same as Q when it is a hydrogen atom, lower alkyl or lower cycloalkyl. As is well known, a ketal can be readily acid-cleaved to an oxo, while a protected hydroxy, e.g., a tetrahydropyran-2-yloxy group can similarly be readily acid-cleaved to the hydroxy. Acid-cleavage may be carried out as described above for cleavage-rearrangements. The

system thus formed, may then be oxidized to the oxo to give the corresponding compound of the compound Ia-type.

The above-described Compounds Ib are obtainable by hydrogenation of a suitable 6(7) unsaturated intermediate; a Compound II,

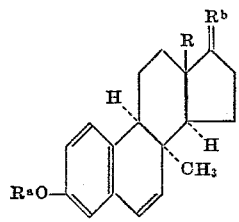

II wherein R, $R^a$ and $R^b$ are as defined above..

The hydrogenation may be accomplished by conventional means for reducing an ethylenically unsaturated unit (Process Ha), i.e., by adding two hydrogen atoms to form a single bond.

Compound II are obtainable by a novel process of this invention which involves hydrogenolysis (Process Hb) of a suitable dicyclo-B-homosteroid, i.e., a Compound III,

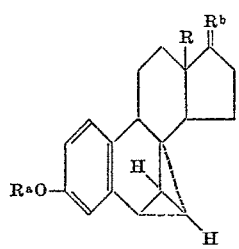

III wherein R, $R^a$ and $R^b$ are as defined above.

The hydrogenolysis (Process Hb) is a novel process which involves the treatment of Compound III with hydrogen at moderate pressures, e.g., at about 1 atmosphere. The process may be carried out in an inert aprotic solvent (free of traces of acid), e.g., ethyl acetate, benzene, glyme, or dioxane, at moderate temperatures, e.g., from about —20° to +30° C., preferably at room temperature (20° to 30° C.), employing as catalyst palladium on charcoal, e.g., 10% palladium on charcoal. Other catalysts such as palladium on an inert carrier such as barium carbonate, may similarly be used.

It will be readily appreciated that Processes Ha and Hb may be carried out in a sequence such that the intermediate (Compound II) formed from Compound III, need not be recovered, but may be further hydrogenated to obtain Compound Ib. A convenient procedure is to carry out Process Hb (completion of which is indicated by the uptake of one mole of hydrogen gas per mole of the Compound III present), and then apply more vigorous hydrogenation conditions to convert Compound II to Ib, e.g., by raising the hydrogen gas pressure, to within the range of up to about 20 atmospheres, by raising the temperature, to within a range up to about 80° C., by lengthening the reaction time or by any combination of such conditions. A proton-containing solvent may be utilized in Process Ha, e.g., a lower alkanol, such as ethanol; but introduction of such solvent is unnecessary and impractical if reactions Hb and Ha are carried out sequentially in the same reaction medium without recovery of the Compound II formed. Reaction products may be recovered by conventional techniques, e.g., crystallization from solution, or column chromatography.

Compound III is a novel compound of this invention and may be obtained by a novel process (Process A), comprising the treatment of a suitable 7,7-dihalo-cyclo [6α,7α]B-homosteroid, i.e., a Compound IV of the formula

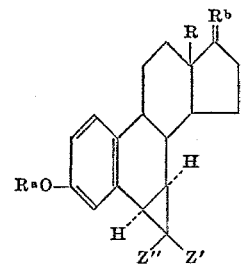

IV wherein R, $R^a$ and $R^b$ are as defined above and each of Z' and Z'' are halogen atoms having an atomic weight of from 35 to 80, i.e., chloro or bromo; with a lower alkyl lithium reagent, e.g., having from 1 to 6 carbon atoms, and preferably being primary, such as methyl or n-butyl at low temperatures, e.g., from about —60° to 30° C., in a suitable inert aprotic solvent, e.g., ethyl ether. Preferably, Process A is carried out in an inert gas atmosphere, e.g., dry nitrogen. It is also preferred that Z'=Z''.

Compounds IV are novel but may be obtained by the usual procedures reported in the literature for the formation of a dihalo-substituted cyclopropyl ring in conjugation with an aromatic ring, e.g., by the reaction of a styrenoid precursor or here a suitable 6(7) unsaturated steroid (Compound V) with a dihalocarbene generated from a so-called dihalocarbene source (a Compound Za), the halogen atoms of which correspond to Z' and Z'' as defined above, i.e., chloro or bromo, or a trihalo acetic acid alkali metal salt, e.g., sodium trichloroacetate.

Preferred dihalocarbene sources are phenyl (trihalomethyl) mercury compounds of the formula

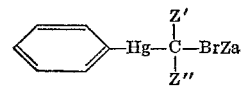

wherein Z' and Z'' are as defined above, and are preferably the same, bromo being particularly preferred.

The reaction of the Compound V and dihalocarbene (Process B) may be carried out, e.g., by heating the reactants at temperatures of from about 70° to 160° C., in an inert organic solvent, e.g., benzene, toluene, cyclohexane, or diglyme. Preferred temperatures are from about 80° to 100° C.

It will be appreciated that in the above-enumerated reactions, certain variations and modifications may be carried out for example, a Compound II may be "deprotected" before being hydrogenated to a Compound Ib-type analog. Such obvious and non-critical variations or modifications of the novel processes of this invention are within the contemplated scope of this invention.

Preparation of a Compound Ib starting from a Compound V is conveniently illustrated by Reaction Scheme B, below wherein R, $R^a$, $R^b$, Z' and Z'' are as defined above.

REACTION SCHEME B

V

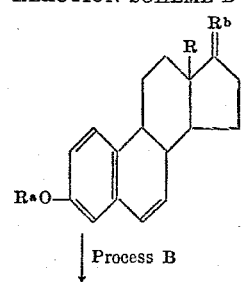

↓ Process B

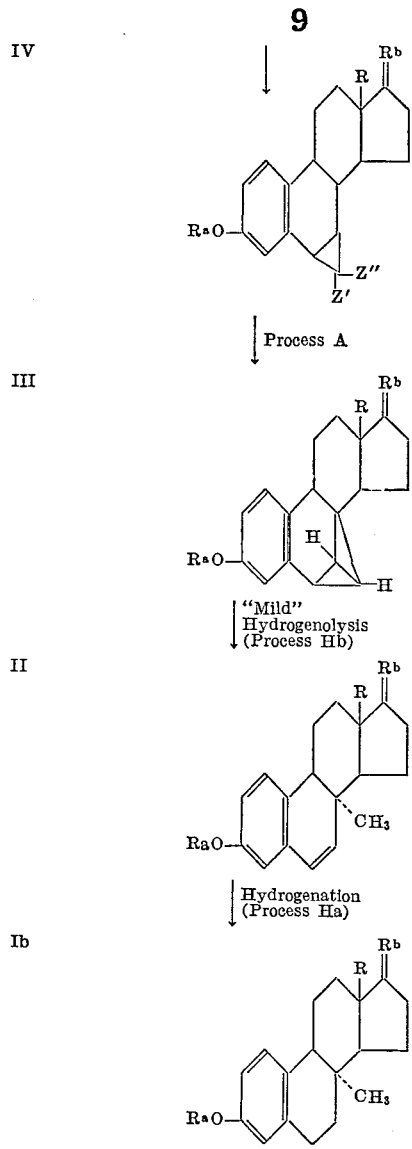

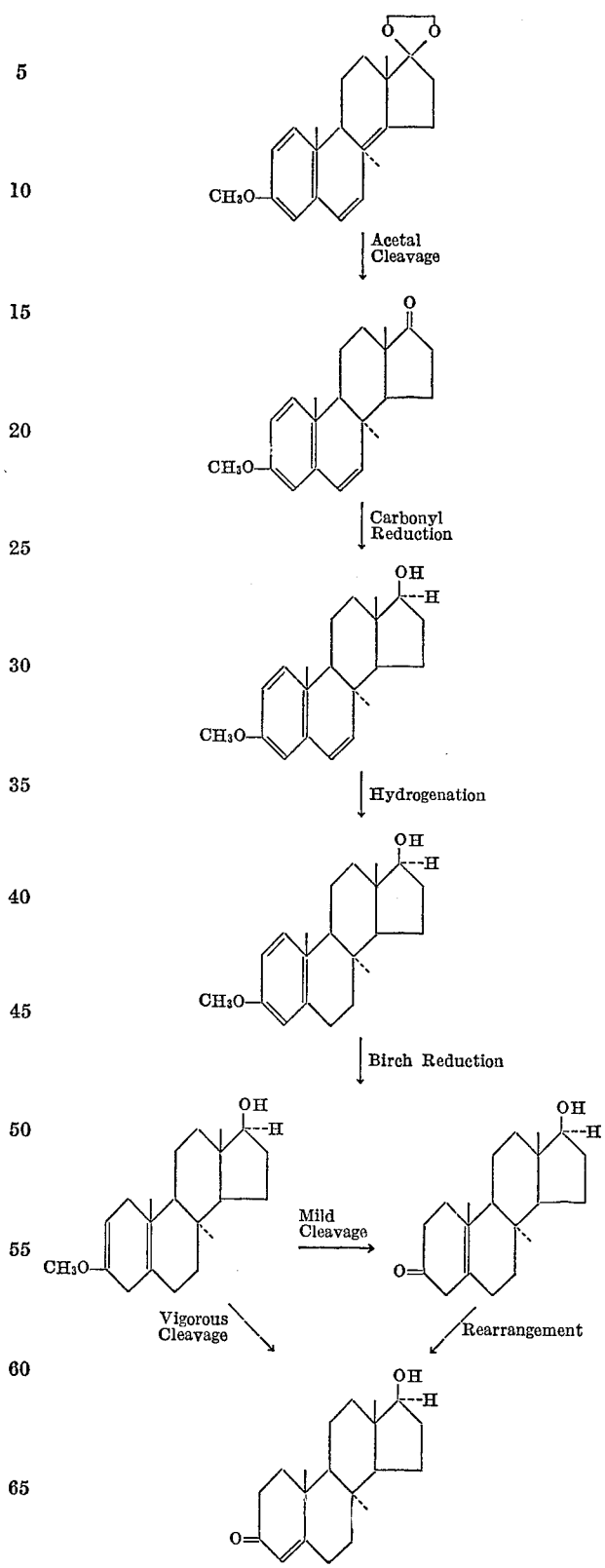

REACTION SCHEME C

Compounds and reagents mentioned in connection with the above-described processes or reactions are either known and may be prepared as described in the literature, or where not known, may be prepared in a manner analogous to that described for the preparation of the known analogs.

For example, a Compound V may be obtained from a corresponding steroid having an A2-type structure by treatment thereof with N-bromosuccinamide followed by treatment with an alkylating agent under strongly basic conditions. Thus, by way of illustration, 17-ethylenedioxy-13-ethylgona-4-en-3-one, in refluxing carbon tetrachloride, is treated with 3 molar equivalents of N-bromosuccinamide (NBS) for 5-minutes and the reaction product (17-ethylenedioxy-13-ethylgona-1,3,5(10)6-tetraen-3-ol) is reacted in refluxing tertiary-butanol with several equivalents of each of potassium-tert.-butoxide and of dimethyl sulfate to give 17-ethylene-dioxy-13-ethyl-3-methoxygona-1,3,5(10),6-tetraene, which is Compound V.

By way of illustration of the variety of conversions and interconversions contemplated as within the scope of this invention, there is presented below Reaction Scheme C, showing the preparation of certain Compounds I wherein A is either A1, A2 or A3, starting from a Compound Ib which is cleaved and reduced at the 17-position before hydrogenation (using the conditions of Process Hb). In Reaction Scheme B, it will be noted that the compounds have a 13-methyl substituent which remains throughout the reactions.

Compounds I are useful because they possess pharmacological properties in animals. In particular, such compounds are useful as fertility control agents in animals as they exhibit estrogenic activity. The estrogenic activity is indicated in the rat as determined by well-known methods, e.g., the method basically described in Am. J. Physiol. 189 (1957) 355.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.01 milligram to 40 milligrams. This daily dosage is preferably given in equally divided doses, e.g., 1 to 2 times a day, or in sustained release form. It will be appreciated by those skilled in the art, that the daily dosage level is independent of body weight. Dosage forms suitable for internal administration comprise from about 0.005 mg. to about 4 mg. of the compound in admixture with a solid or liquid pharmaceutical carrier or diluent.

A representative formulation suitable for oral administration is a capsule (250 mg.) prepared by standard techniques which contains the following:

| Ingredient: | Weight (mg.) |
|---|---|
| 3 - mehtoxy - 8α-methylestra-1,3,5(10)-trien-17β-ol | 0.5 |
| Inert solid diluent (starch, lactose, kaolin) | 249.5 |

The following examples are provided as illustrative of the invention; all temperatures are centigrade and room temperature is 20° to 30° C., unless indicated otherwise.

EXAMPLE 1

3-methoxy-8α-methylestra-1,3,5(10)-triene-17β-ol

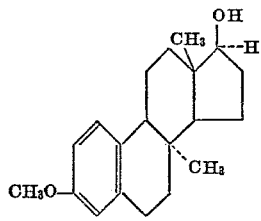

Step A: 7,7-dibromo-17-ethylenedioxy-3-methoxy-cyclo[6α,7aα]-B-homoestra-1,3,5(10)-triene

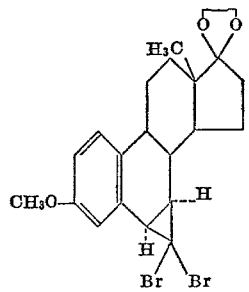

A mixture of 9.255 g. of 17-ethylenedioxy-3-methoxy-estra-1,3,5(10),6-tetraene, 16.7 g. of phenyltribromomethyl mercury and 285 ml. of cyclohexane is heated under reflux for 18 hours. After cooling, phenylmercuric bromide is removed by filtration and the filtrate is evaporated to dryness to obtain a residue (yellow gum). The residue, upon trituration with ether, crystallizes to give 7,7 - dibromo - 17 - ethylenedioxy - 3 - methoxy-cyclo [6α,7aα] - B - homoestra - 1,3,5(10)-triene, M.P. 199°–200°, [α]$_D$=—80.4 (c.=1, CHCl$_3$).

Step B: 17-ethylenedioxy-3-methoxy-dicyclo[6,7a,7,8]-B-homoestra-1,3,5(10)-triene

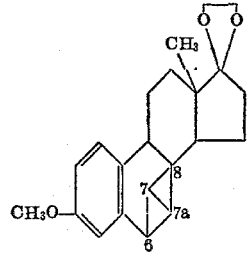

To 70 ml. of 1.7 M methyllithium/ether solution, stirred under nitrogen at —65° C, there is added, in one portion 3.0 g. of 7,7-dibromo-17-ethylenedioxy-3-methoxy-cyclo[6α,7aα] - B-homoestra - 1,3,5(10)-triene. After 25 min. stirring at this temperature, the mixture is gradually (90 min.) warmed to 25°, and carefully decomposed with ice-water. The aqueous phase is extracted with ethyl acetate (3× 20 ml.) and the organic layers are combined, washed and dried (over anhydrous sodium sulfate) and then concentrated to about 5 ml. On storage at 0°, 17 - ethylenedioxy - 3 - methoxy-dicyclo[6,7a,7,8]-B-homoestra - 1,3,5(10) - triene crystallizes M.P. 159–161°, [α]$_D$=+51.7° (C=1, CHCl$_3$+pyridine).

Step C: 17-ethylenedioxy-3-methoxy-8α-methyl-estra-1,3,5(10),6-tetraene

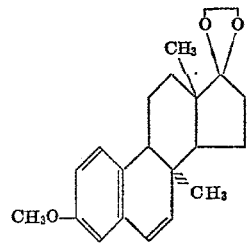

To a slurry of 666 mg. of pre-hydrogenated palladium on charcoal 10% catalyst in 136 ml. of ethyl acetate, stirred in a hydrogen atmosphere, a little over 1 at., there is added a solution of 850 mg. of 17-ethylenedioxy-3 - methoxy - dicyclo[6,7a,7,8] - B-homoestra-1,3,5(10)-triene in 20 ml. of ethyl acetate. After the uptake of 1 equivalent of hydrogen gas (about 5 min.), the hydrogenation is interrupted, the catalyst filtered off and the solution evaporated to dryness to obtain a residue. The residue is crystallized from ether-methanol (1:1) to yield 17 - ethylenedioxy - 3-methoxy-8α-methylestra-1,3,5(10), 6-tetraene M.P. 101.5–103°[α]$_D$=—31.59° (C=1, CHCl$_3$).

Step D: 3-methoxy-8α-methylestra-1,3,5(10),6-tetraen-17-one

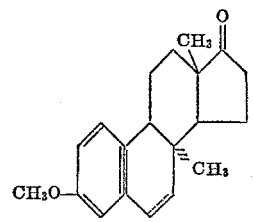

A solution of 337 mg. of 17-ethylenedioxy-3-methoxy-8α-methylestra-1,3,5(10),6-tetrane in 14.85 ml. of 90% (v./v.) aqueous acetic acid is kept at 25° for 18 hours. 30 ml. of water is added and the resultant 3-methoxy-8α-methylestra-1,3,5(10),6-tetraen-17-one is recovered by benzene extraction and crystallization M.P. 138–142°.

Step E: 3-methoxy-8α-methylestra-1,3,5(10),6-tetraen-17β-ol

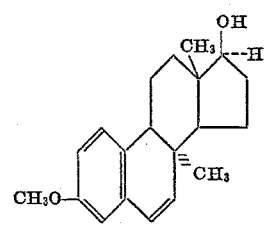

A mixture of 296 mg. of 3-methoxy-8α-methylestra-1,3,5(10),6-tetraen-17-one 10.5 ml. of methylene dichloride, 10.5 ml. of absolute ethanol and 450 mg. of sodium borohydride is stirred at 0° for 5 hours. Ice-water is added, the mixture is extracted with methylene dichloride and the extract re-crystallized from ether-petroleum ether (1:1) to yield 3-methoxy-8α-methylestra-1,3,5(10),6-tetraen-17β-ol, M.P. (118)–122–125°).

The 17-bromoacetate derivative of the title product is prepared from the title compound and bromoacetyl chloride in the conventional manner, and melts at 145–147° C.; [T]$_D$=−14.36° (C=1, CHCl$_3$).

Step F: 3-methoxy-8α-methylestra-1,3,5(10)-trien-17β-ol

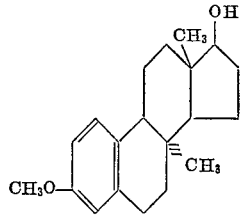

265 mg. of 3-methoxy-8α-methylestra-1,3,5(10),6-tetraen-17β-ol is dissolved in 10 ml. of absolute ethanol and hydrogenated at 75° under 40 p.s.i.g., pressure with 50 mg. catalyst (pre-hydrogenated palladium on charcoal: 10%). The catalyst is filtered off and the solution is evaporated to obtained a residue. Crystallization of the residue from ether-petroleum ether (1:1) gives 3-methoxy - 8α - methylestra-1,3,5(10)-trien-17β-ol, M.P. 142–143° [α]$_D$=+46.49 (C=1, CHCl$_3$).

Step G: 3-methoxy-8α-methylestra-1,3,5(10)-trien-17-one

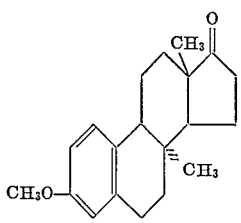

To a solution of 260 mg. of chromium trioxide in 8 ml. of pyridine, there is added 302 mg. of 3-methoxy-8α-methlestra-1,3,5(10-trien-17β-ol. The mixture is stored 18 hours at room temperature, following which it is poured on ice-water. The crude compound is then extracted with benzene. The extracts are combined and passed through a short column of alumina, and the title compound is recovered by evaporation.

EXAMPLE 2

3-methoxy-8α-methylestra-1,3,5(10)-triene-17-one (alternative method)

Step A: 17-ethylenedioxy-3-methoxy-8α-methylestra-1,3,5(10), triene

To prehydrogenated slurry of 52 mg. of palladium on charcoal (10%) catalyst in 20 ml. of dimethoxy-ethane, there is added 300 mg. of 17-ethylenedioxy-3-methoxy-dicyclo [6.7a;7,8]-B-homoestra-1,3,5(10)-triene and stirring in a hydrogen atmosphere of 45 p.s.i.g., started. After 30 minutes at room temperature, the temperature is raised to 48° and steadily continued for 4 hours. After cooling, the catalyst is filtered off and the crude 17-ethylendioxy-3 - methoxy - 8α-methylestra-1,3,5(10-triene is obtained by evaporation of the solvent.

Step B: 3-methoxy-8α-methylestra-1,3,5(10)-triene-17-one

Hydrolysis step: The crude ketal derivative obtained in Step A above (as residue) is dissolved in 13.5 ml. of glacial acetic acid; 1.35 ml. of water is added and the mixture kept at 25° for 4 hours. More water (150 ml.) is then added and the steroid extracted with benzene. The (3× 100 ml.) combined benzene layers are washed with 10% aqueous sodium bicarbonate, then water and then dried over anhydrous sodium sulfate (Na$_2$SO$_4$). The combined benzene layers are evaporated to a residue (gum) that is crystallized (and then recrystallized) from ether to give the title product M.P. 146–149.5°.

EXAMPLE 3

Step A: 3-hydroxy-8α-methylestra-1,3,5(10)-trien-17-one

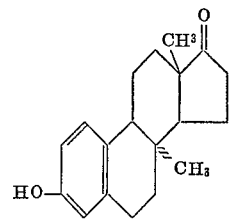

A solution of 300 mg. of 3-methoxy-8α-methylestra-1,3,5(10)-trien-17-one and of 1.0 g. of lithium iodide in 5 ml. of dimethyl acetamide is heated under reflux until thin layer chromatography indicates that the formation of a more polar product is complete. After cooling, water is added and the product collected by filtration.

Step B: 8α-methylestrone acetate

A solution of 350 mg. of the above 3-hydroxy-8α-methylestra - 1,3,5(10)-triene-17-one (8α-methylestrone) and of 1.2 g. of acetic anhydride in 10 ml. of pyridine is allowed to stand at 0° for 18 hours and then poured on ice-water whereupon the crystalline title product is filtered off and purified by recrystallization from ethyl acetate.

Step C: 3-isopropyloxy-8α-methylestra-1,3,5(10)-trien-17-one

A solution of 3-hydroxy-8α-methylestra-1,3,5(10)-trien-17-one (500 mg.) from Step A in boiling isopropyl alcohol (20 mg.) is alternately treated with small portions of sodium isopropylate and isopropyl iodide until analytical thin layer chromatography indicates the disappearance of starting material. Water is then added (100 ml.) and the title product removed by filtration. It is purified by chromatography on alumina (Grade 3) using benzene as an eluent.

Carrying out the above procedure, but replacing the isopropyl alcohol, the sodium isopropylate and the isopropyl iodide with equivalent amounts of t-butanol, potassium t-butylate and cyclopentyl bromide, respectively, there is obtained 3 - cyclopentyloxy - 8α-methylestra-1,3,5(10)-trien-17-one.

EXAMPLE 4

17α-ethyl-3-methoxy-8α-methylestra-1,3,5(10)-trien-17β-ol

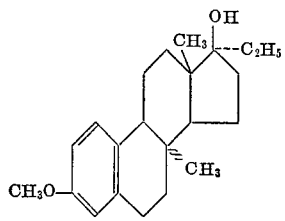

To a Grignard mixture prepared from 0.52 g. of magnesium and 2.1 ml. of ethyl bromide in 20 ml. of anhydrous tetrahydrofuran, there is dropwise added at 60° C. a solution of 425 mg. of 3-methoxy-8α-methylestra-1,3,5(10)-trien-17-one in 8 ml. of tetrahydrofuran. Under nitrogen atmosphere, the mixture is refluxed for 5 hours, then cooled, decomposed by the addition of 15 ml. of saturated ammonium chloride solution and extracted with chloroform. The title product is obtained by the evaporation of the dried and washed (H$_2$O) chloroform solution and is purified by recrystallization from ethanol.

When allyl bromide is substituted for ethyl bromide in the process of this example, there is obtained 17α-allyl-3-methoxy-8α-methylestra-1,3,5(10)-trien-17β-ol.

When 17α - ethyl - 3 - methoxy - 8α - methylestra- 1,3,5(10) - trien - 17β - ol or 17α-allyl-3-methoxy-8α-methylestra - 1,3,5(10) - trien - 17β-ol is used in place of 3 - methoxy - 8α - methylestra - 1,3,5(10)-trien-17-one in the process of Example 3A, there is obtained 17α - ethyl - 8α - methylestra - 1,3,5(10)-trien-3,17β-diol or 17α - allyl - 8α - methylestra-1,3,5(10)-trien-3,17β-diol.

EXAMPLE 5

17α-ethynyl-3-methoxy-8α-methylestra-1,3,5(10)-trien-17β-ol

To a mixture of 2.1 g. of lithium acetylide-ethylenediamine complex in 15 ml. of anhydrous dimethyl acetamide, there is added 825 mg. of 3-methoxy-8α-methylestra - 1,3,5(10)-trien-17-one. After 2 hours at 20°, the mixture is poured onto 100 ml. of 2 N hydrochloric acid. The title product which separates as a solid, is removed by filtration and purified by recrystallization from ethyl acetate-hexane.

When cyclohexyl lithium is used in place of lithium acetylide in the process of this example, there is obtained 17α - cyclohexyl - 3 - methoxy-8α-methylestra-1,3,5(10)-trien-17β-ol.

Following the procedure of Example 3A but using 17α - ethynyl - 3 - methoxy - 8α-methylestra-1,3,5(10)-trien - 17β - ol or 17α-cyclohexyl-3-methoxy-8α-methylestra - 1,3,5(10) - trien - 17β-ol in place of 3-methoxy-8α - methylestra - 1,3,5(10) - trien-17-one, there is obtained 17α - ethynyl - 8α - methylestra - 1,3,5(10)-trien-3,17β - diol or 17α-cyclohexyl-8α-methylestra-1,3,5(10)-trien-3,17β-diol.

EXAMPLE 6

17α-fluoroethynyl-3-methoxy-8α-methylestra-1,3,5(10)-trien-17β-ol

A solution of 8.5 grams of 1-chloro-2-fluoroethylene in 50 cc. of anhydrous diethyl ether is added dropwise with stirring, at 0° C. over a half hour period, to 15 cc. of a 1.4 N solution of methyl lithium in anhydrous diethyl ether, maintained under an inert nitrogen atmosphere. The mixture is then held at room temperature, with stirring, for an additional 90 minutes.

A solution of 0.5 gram of 3-methoxy-8α-methylestra-1,3,5(10)-trien-17-one in 20 cc. of anhydrous diethyl ether is then added dropwise, with stirring, over a 15 minute period, following which the resulting reaction mixture is held at room temperature, with stirring, for 18 hours. Following this reaction period, the reaction mixture is poured into ice-water and then extracted with diethyl ether. The combined ether extracts are washed with water, dried over anhydrous sodium sulfate and then concentrated under vacuum. Chromatography of the residue on basic alumina, using petroleum ether/diethyl ether (8:2, respectively, by volume) as the eluant, followed by crystallization from methanol, yields 17α - fluoroethynyl-3-methoxy-8α-methylestra-1,3,5(10)-trien-17β-ol.

When 17α-fluoroethynyl-3-methoxy-8α-methylestra-1,3,5(10)-trien-17β-ol is used in place of 3-methoxy-8α-methylestra-1,3,5(10)-trien-17β-one in the process 7, Example 3A, there is obtained 17α-fluoroethynyl-8α-methylestra-1,3,5(10)-trien-3,17β-diol.

EXAMPLE 7

3-methoxy-8α-methyl-17α-propadienylestra-1,3,5(10)-trien-17β-ol

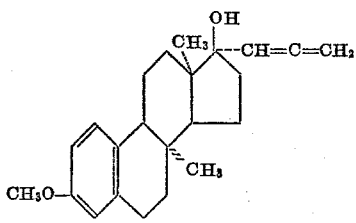

Step A: 3-methoxy-8α-methyl-17α-dimethylaminopropynylestra-1,3,5(10)-triene-17β-ol To a solution of 2 g. of lithium metal in 36 ml. of ethylene diamine, there is added dropwise 15 ml. of 3-dimethylamino propyne. To the reagent thus obtained, a solution of 3.2 g. of 3-methoxy-8α-methylestra-1,3,5(10)-trien-17-one in 20 ml. of tetrahydrofuran is added dropwise. After 3 hours at room temperature, the title product is isolated by quenching on ice-water and extracting with chloroform.

Step B: 3-methoxy-8α-methyl-17α-dimethylaminopropynylestra-1,3,5(10)-trien-17β-ol-methiodide The crude title product of Step A is dissolved in 40 ml. of acetone and 6 ml. of methyl iodide is added. The crystals separated after 18 hours at 5° are filtered to give the Step B title product.

Step C: 3-methoxy-8α-methyl-17α-propadienyl-estra-1,3,5(10)-trien-17β-ol

To a solution of 4.2 g. of the product of Step B, in 120 ml. of absolute pyridine, there is added 0.5 g. of lithium aluminum hydride. After 20 minutes at room temperature, water and 5% sodium hydroxide solution are added and the mixture filtered from the separated alumina. The pyridine is stripped off in vacuo and the residue taken up in benzene and with water. After drying over sodium sulfate, the benzene solution is evaporated to give the 3-methoxy-8α-methyl-17α-propadienylestra-1,3,5(10)-trien-17β-ol.

Following the procedure of Example 3A but using 3-methoxy - 8α - methyl - 17α - propadienylestra-1,3,5(10)-trien-17β-ol in place of 3-methoxy-8α-methylestra-1,3,5-(10)-17β-one, there is obtained 8α-methyl-17α-propadienylestra-1,3,5(10)-trien-3,17β-diol.

EXAMPLE 8

17β-acetoxy-17α-ethyl-8α-methylestra-1,3,5(10)-trien-3-ol

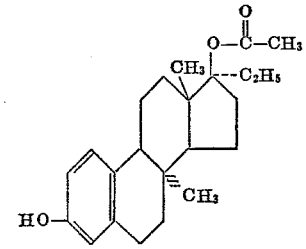

Step A: 3,17β-diacetoxy-17α-ethyl-8α-methyl-estra-1,3,5(10)-triene 1 g. of 17α-ethyl-8α-methylestra-1,3,5(10)-trien-3,17β-diol, prepared as described in Example 4, 1 g. of p-toluene sulfonic acid monohydrate, 50 ml. of acetic acid and 25 ml. acetic anhydride is allowed to stand at room temperature for 24 hours. The reaction mixture is then poured into water and stirred until the excess acetic anhydride is hydrolyzed. The aqueous mixture is then extracted with methylene dichloride, the organic phase separated, water washed, dried over sodium sulfate evaporated under vacuum to obtain the product 3,17β-diacetoxy-17α-ethyl-8α-methylestra-1,3,5(10)-triene as residue, which is then refined by crystallization from methanol.

When

17α-allyl-8α-methylestra-1,3,5(10)-trien-3,17β-diol,
17α-ethynyl-8α-methylestra-1,3,5(10)-trien-3,17β-diol,
17α-cyclohexyl-8α-methylestra-1,3,5(10)-trien-3,17β-diol;
17α-fluoroethynyl-8α-methylestra-1,3,5(10)-trien-3,17β-diol, or
8α-methyl-17α-propadienylestra-1,3,5(10)-trien-3,17β-diol is used in place of 17α-ethyl-8α-methylestra-1,3,5(10)-trien-3,17β-diol in the above process, there is obtained:

3,17β-diacetoxy-17α-allyl-8α-methylestra-1,3,5(10)-triene;

3,17β-diacetoxy-17α-ethynyl-8α-methylestra-1,3,5(10)-triene;

3,17β-diacetoxy-17α-cyclohexyl-8α-methylestra-1,3,5(10)-triene;
3,17β-diacetoxy-17α-fluoroethynyl-8α-methylestra-1; 3,5(10)-triene or
3,17β-diacetoxy-8α-methyl-17α-propadienylestra-1,3,5-(10)-triene, respectively.

Step B: 17β-acetoxy-17α-ethyl-8α-methylestra-1,3,5(10)-trien-3-ol 1 g. of 3,17β-diacetoxy-17α-ethyl-8-methylestra-1,3,5-(10)-triene is dissolved in 40 ml. of methanol at about 0°. 500 mg. of potassium hydroxide in 10 ml. of water cooled to about 0° is then added thereto, and the reaction mixture maintained at 0° for 24 hours. The reaction mixture is then poured into ice-water, the crude title compound separates and is collected by filtration, water washed and refined by crystallization from methanol-ether (1:1). When 3,17β-diacetoxy-17α-allyl-8α-methylestra-1,3,5(10)-triene;
3,17β-diacetoxy-17α-ethynyl-8α-methylestra-1,3,5(10)-triene;
3,17β-diacetoxy-17α-cyclohexyl-8α-methylestra-1,3,5(10)-triene;
3,17β-diacetoxy-17α-fluoroethynyl-8α-methylestra-1,3,5(10)-triene or
3,17β-diacetoxy-8α-methyl-17α-propadienylestra-1,3,5(10)-triene, is used in place of 3,17β-diacetoxy-17α-ethyl-8α-methylestra-1,3,5(10)-triene in the process of Step 8B, there is obtained 17β-acetoxy-17α-allyl-8α-methylestra-1,3,5(10)-trien-3-ol;
17β-acetoxy-17α-ethynyl-8α-methylestra-1,3,5(10)-trien-3-ol;
17β-acetoxy-17α-cyclohexyl-8α-methylestra-1,3,5(10)-trien-3-ol;
17β-acetoxy-17α-fluoroethynyl-8α-methylestra-1,3,5(10)-trien-3-ol; or
17β-acetoxy-8α-methyl-17α-propadienylestra-1,3,5(10)-trien-3-ol, respectively.

EXAMPLE 9

3-acetoxy-17α-ethyl-8α-methylestra-1,3,5(10)-trien-17β-ol

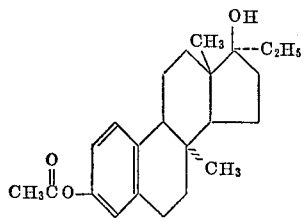

1 g. of 17α-ethyl-8α-methylestra-1,3,5(10)-trien-3,17β-diol, prepared as described in Example 4, 50 ml. of pyridine and 25 ml. acetic anhydride is allowed to stand at room temperature for 24 hours. The reaction mixture is then poured into water and stirred until the excess acetic anhydride is hydrolyzed. The aqueous mixture is then extracted with methylene dichloride, the organic phase separated, water washed, dried over sodium sulfate evaporated under vacuum to obtain the title product as residue, which is then refined by crystallization from methanol.
When 17α-allyl-8α-methylestra-1,3,5(10)-trien-3,17β-diol,
17α-ethynyl-8α-methylestra-1,3,5(10)-trien-3,17β-diol,
17α-cyclohexyl-8α-methylestra-1,3,5(10)-trien-3,17β-diol;
17α-fluoroethynyl-8α-methylestra-1,3,5(10)-trien-3,17β-diol, or
8α-methyl-17α-propadienylestra-1,3,5(10)-trien-3,17β-diol is used in place of 17α-ethyl-8α-methylestra-1,3,5(10)-trien-3,17β-diol in the above process, there is obtained 3-acetoxy-17α-allyl-8α-methylestra-1,3,5(10)-trien-17β-ol;
3-acetoxy-17α-ethynyl-8α-methylestra-1,3,5(10)-trien-17β-ol;
3-acetoxy-17α-cyclohexyl-8α-methylestra-1,3,5(10)-trien-17β-ol;
3-acetoxy-17α-fluoroethynyl-8α-methylestra-1,3,5(10)-trien-17β-ol or
3-acetoxy-8α-methyl-17α-propadienylestra-1,3,5(10)-trien-17β-ol, respectively.

EXAMPLE 10

17β-acetoxy-17α-ethyl-3-methoxy-8α-methylestra-1,3,5(10)-triene

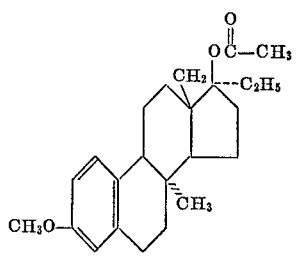

1 g. of 17α-ethyl-3-methoxy-8α-methylestra-1,3,5(10)-trien-17β-ol, prepared as described in Example 4, 1 g. of p-toluene sulfonic acid monohydrate, 50 ml. of acetic acid and 25 ml. acetic anhydride is allowed to stand at room temperature for 24 hours. The reaction mixture is then poured into water and stirred until the excess acetic anhydride is hydrolyzed. The aqueous mixture is then extracted with methylene dichloride, the organic phase separated, water washed, dried over sodium sulfate evaporated under vacuum to obtain the product 17β-acetoxy-17α - ethyl-3-methoxy-8α-methylestra-1,3,5(10)-triene, as residue, which is then refined by crystallization from methanol.
When 3-methoxy-8α-methylestra-1,3,5(10)-trien-17β-ol;
17α-allyl-3-methoxy-8α-methylestra-1,3,5(10)-trien-17β-ol;
17α-ethynyl-3-methoxy-8α-methylestra-1,3,5(10)-trien-17β-ol;
17α-cyclohexyl-3-methoxy-8α-methylestra-1,3,5(10)-trien-17β-ol;
17α-fluoroethynyl-3-methoxy-8α-methylestra-1,3,5(10)-trien-17β-ol; or
3-methoxy-8α-methyl-17α-propadienylestra-1,3,5(10)-trien-17β-ol is used in place of 17α-ethyl-3-methoxy-8α-methylestra-1,3,5(10)-trien-17β-ol in the above process there is obtained 17β-acetoxy-3-methoxy-methylestra-1,3,5(10)-triene;
17β-acetoxy-17α-allyl-3-methoxy-8α-methylestra-1,3,5(10)-triene;
17β-acetoxy-17α-ethynyl-3-methoxy-8α-methylestra-1,3,5(10)-triene;
17β-acetoxy-17α-cyclohexyl-3-methoxy-8α-methylestra-1,3,5(10)-triene;
17β-acetoxy-17α-fluoroethynyl-3-methoxy-8α-methylestra-1,3,5(10)-triene or
17β-acetoxy-3-methoxy-8α-methyl-17α-propadienylestra-1,3,5(10)-triene, respectively.

EXAMPLE 11

8α-methylestra-1,3,5(10)-trien-3,17β-diol

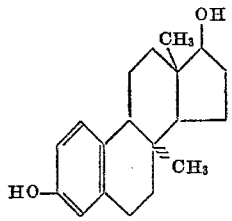

To a mixture containing 3 equivalents of lithium tri-tert-butoxyaluminum hydride in 50 ml. of ether, there is dropwise added 365 mg. of 3-hydroxy-8α-methylestra-1,3,5(10)-trien-17-one prepared as described in Step A of Example 3 in 20 ml. of ether at 20° temperature. After 8 hours stirring, methanol is added followed by ice-water and extracted with ethyl acetate. The ethyl acetate solution is washed with water, dried over sodium sulfate and upon evaporation yields 8α-methylestra-1,3,5(10)-trien-3,17β-diol which is recrystallized from ethanol.

When 8α-methylestrone acetate prepared as described in Step B of Example 3 is used in place of 3-hydroxy-8α-methylestra-1,3,5(10)-trien-17-one in the above process, there is obtained 3-acetoxy-8α-methylestra-1,3,5(10)-trien-17β-ol.

EXAMPLE 12

17β-acetoxy-8α-methylestra-1,3,5(10)-trien-3-ol

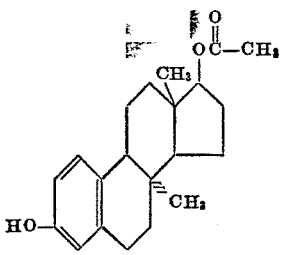

Step A: 8α-methyl-3-tetrahydrofuranyloxy-estra-1,3,5(10)-trien-17-one

To mixture of 15 ml. of benzene, 3 ml. of dihydrofuran and 1.2 g. of phosphorus oxychloride there is added a benzene (3 ml.) solution containing 500 mg. of 3-hydroxy-8α-methylestra-1,3,5(10)-trien-17-one prepared as described in Example 3. After 18 hours at room temperature, the mixture is poured over 50 g. of ice containing 5 g. of sodium carbonate; the benzene layer is separated, washed and evaporated to give the product 8α-methyl-3-tetrahydrofuranyloxyestra - 1,3,5(10)-trien-17-one which is then purified by recrystallization from ether.

Step B: 8α-methyl-3-tetrahydrofuranyloxy-estra-1,3,5(10)-trien-17β-ol

To a mixture containing 3 equivalents of lithium tri-tert-butoxyaluminum hydride in 50 ml. of ether, there is dropwise added 365 mg. of 8α-methyl-3-tetrahydrofuranyloxyestra-1,3,5(10)-trien-17-one in 20 ml. of ether at 20° temperature. After 8 hours stirring, methanol is added followed by ice-water and extraction with ethyl acetate. The ethyl acetate solution is washed with water, dried over sodium sulfate and upon evaporation yields 8α-methyl-3-tetrahydrofuranyloxyestra - 1,3,5(10) - trien-17β-ol recrystallized from ethanol.

Step C: 17β-acetoxy-8α-methyl-3-tetrahydro-furanyloxyestra-1,3,5(10)-trien 300 mg. of 8α-methyl-3-tetrahydrofuranyloxyestra-1,3,5(10)-trien-17β-ol diol, 1 g. of p-toluene sulfonic acid monohydrate, 50 ml. of acetic acid and 25 ml. acetic anhydride is allowed to stand at room temperature for 24 hours. The reaction mixture is then poured into water and stirred until the excess acetic anhydride is hydrolyzed. The aqueous mixture is then extracted with methylene dichloride, the organic phase separated, water washed, dried over sodium sulfate, evaporated under vacuum to obtain the product 17β-acetoxy-8α-methyl-3-tetrahydro-furanyloxyestra-1,3,5(10)-triene as residue, which is then refined by crystallization from methanol.

Step D: 17β-acetoxy-8α-methylestra-1,3,5(10)-trien-3-ol

A solution of 300 mg. of 17β-acetoxy-8α-methyl-B-tetrahydrofuranyloxyestra-1,3,5(10)-triene in 14.85 ml. of 80% (v./v.) aqueous acetic acid is kept at 25° for 6 hours. 30 ml. of water is added and the resultant 17β-acetoxy-8α-methylestra-1,3,5(10)-trien-3-ol is recovered by benzene extraction and recrystallization.

EXAMPLE 13

17β-hydroxy-8α-methylestra-5(10)-en-3-one

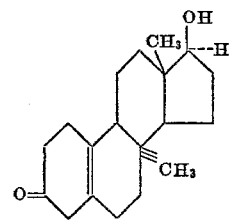

Step A: 3-methoxy-8α-methylestra-2,5(10)-dien-17β-ol

To a solution of 3.6 g. of 3-methoxy-8α-methylestra-1,3,5(10)-trien-17β-ol prepared as described in Step F of Example 1, in a refluxing (—30°) mixture of 100 ml. of liquid ammonia, 30 ml. of tetrahydrofuran and 20 ml. of tertiary butanol, there is added in small pieces 0.8 g. of lithium metal. The resulting mixture is maintained at about —30° for 3 hours, after which 30 ml. of methanol is then carefully added and the ammonia allowed to escape. Ice-cold 0.5 m. aqueous sodium hydroxide solution is then added (200 ml.) and the mixture concentrated in vacuo to a volume of 80 ml. whereupon 3-methoxy-8α-methylestra-2,5(10)-dien-17β-ol separates as a solid, and is filtered off and dried.

Step B: 17β-hydroxy-8α-methylestra-5(10)-en-3-one

A solution of 1 g. of 3-methoxy-8α-methylestra-2,5-(10)-dien-17β-ol in 80 ml. of methanol is admixed with a solution of 1 g. of oxalic acid in 20 ml. of water and the resulting mixture is kept at 50° for 30 minutes. Following this reaction period, the mixture is concentrated in vacuo to about 20 ml. then poured into ice-water. The resulting precipitate is collected by filtration, washed with water until neutral then dried. Recrystallization of the dry precipitate from acetone-hexane (1:1) gives 17β-hydroxy-8α-methylestra-5(10)-en-3-one.

EXAMPLE 14

17α-ethyl-17β-hydroxy-8α-methylestra-5(10)-en-3-one

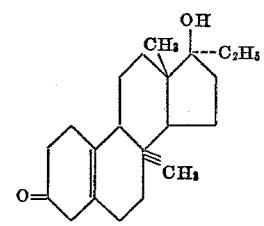

Step A: 3-methoxy-8α-methylestra-2,5(10)-dien-17-one

A mixture of 2.3 g. of 3-methoxy-8α-methylestra-2,5-(10)-dien-17β-ol prepared as described in Step A of Example 13 above, 5.3 g. of aluminum isopropoxide, 40 ml. of 2-butanone and 40 ml. of benzene is refluxed in a nitrogen atmosphere for 48 hours. After cooling, 50 ml. of ice-cold 2 N aqueous sodium hydroxide solution is added and after filtration, the benzene layer was washed and dried. Evaporation and recrystallization from aqueous alcohol yield 3-methoxy-8α-methylestra-2,5(10)-diene-17-one.

Step B: 17α-ethyl-3-methoxy-8α-methyl-estra-2,5(10)-dien-17β-ol

To a Grignard mixture prepared form 0.52 g. of magnesium and 2.1 ml. of ethyl bromide in 20 ml. of anhydrous tetrahydrofuran, there is added dropwise at 60° C. a solution of 425 mg. of 3-methoxy-8α-methylestra-2,5-(10)-dien-17-one in 8 ml. of tetrahydrofuran. Under nitrogen atmosphere, the mixture is refluxed for 5 hours, then cooled, decomposed by the addition of 15 ml. of saturated ammonium chloride solution and extracted with chloroform. The product 17α-ethyl-3-methoxy-8α-methylestra-2,5(10)-dien-17β-ol is obtained by the evaporation of the dried and washed (H₂O) chloroform solution and is purified by recrystallization from ethanol.

Step C: 17α-ethyl-17β-hydroxy-8α-methyl-estra-5(10)-en-3-one

Following the procedure of Step B of Example 13 but using an equivalent amount of 17α-ethyl-3-methoxy-8α-methylestra-2,5(10)-dien-17β-ol in place of the 3-methoxy-8α-methylestra-2,5(10)-dien-17β-ol used therein, there is obtained 17α-ethyl-17β-hydroxy-8α-methylestra-5(10)-en-3-one.

When an equivalent amount of allyl bromide is used in place of ethyl bromide in Step A above, the processes of this example yield 17α-allyl-17β-hydroxy-8α-methylestra-5(10)-en-3-one.

EXAMPLE 15

17α-ethynyl-17β-hydroxy-8α-methylestra-5(10)-en-3-one

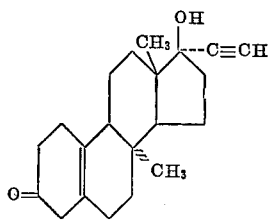

Step A: 17α-ethynyl-3-methoxy-8α-methyl-estra-2,5(10)-dien-17β-ol

To a mixture of 2.1 g. of the lithium acetylide-ethylene diamine complex in 15 ml. of anhydrous dimethyl acetamide, there is added 740 mg. of 3-methoxy-8α-methylestra-2,5(10)-dien-17-one obtainable as described in Step A of Example 14. After 2 hours at 20°, the mixture is poured on ice-water and the separating solids are filtered off, washed with water until neutral, dried and then crystallized from acetone-hexane (1:1) to give 17α-ethynyl-3-methoxy-8α-methylestra-2,5(10)-dien-17β-ol.

Step B: 17α-ethynyl-17β-hydroxy-8α-methyl-estra-5(10)-en-3-one

Following the procedure of Step B of Example 13 except replacing the 3-methoxy-8α-methylestra-2,5(10)-dien-17β-ol used therein with an equivalent amount of 17α - ethynyl - 3 - methoxy - 8α - methylestra-2,5(10)-dien-17β-ol there is obtained 17α - ethynyl-17β-hydroxy-8α-methylestra-4-en-3-one.

When an equivalent amount of cyclohexyl lithium is used in place of lithium acetylide in Step A above, the processes of this example yield 17α-cyclohexyl-17β-hydroxy-8α-methylestra-5(10)-en-3-one.

EXAMPLE 16

17α-fluoroethylnyl-17β-hydroxy-8α-methylestra-5(10)-en-3-one

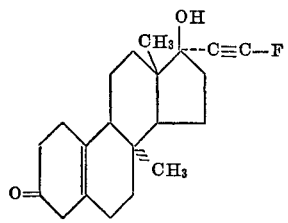

Step A: 17α-fluoroethynyl-3-methoxy-8α-methyl-estra-2,5(10)-dien-17β-ol

A solution of 8.5 grams of 1-chloro-2-fluoroethylene in 50 cc. of anhydrous diethyl ether is added dropwise with stirring, at 0° C. over a half hour period, to 15 cc. of a 1.4 N solution of methyl lithium in anhydrous diethyl ether, maintained under an inert nitrogen atmosphere, and the mixture is then held at room temperature, with stirring, for an additional 90 minutes.

A solution of 0.5 gram of 3-methoxy-8α-methylestra-2,5(10)-dien-17-one prepared as described in Step A of Example 14 in 20 cc. of anhydrous diethyl ether is then added dropwise, with stirring, over a 15 minute period, following which the resulting reaction mixture is held at room temperature, with stirring, for 18 hours. Following this reaction period the reaction mixture is poured into ice-water and then extracted with diethyl ether. The ether extract is washed with water, dried over anhydrous sodium sulfate and then concentrated under vacuum. Chromatography of the residue on basic alumina, using petroleum ether/diethyl ether (8:2, respectively, by volume) as the eluant, followed by crystallization from methanol, yields 17α - fluoroethynyl-3-methoxy - 8α - methylestra-2,5(10)-dien-17β-ol.

Step B: 17α-fluoroethynyl-17β-hydroxy-8α-methylestra-5(10)-en-3-one

Following the procedure of Step B, Example 13 except replacing the 3-methoxy-8α-methylestra-2,5(10)-dien-17β-ol used therein with an equivalent amount of 17α-fluoroethynyl - 3 - methoxy - 8α - methylestra - 2,5(10)-dien-17β-ol there is obtained 17α-fluoroethynyl-17β-hydroxy-8α-methylestra-5(10)-en-3-one.

EXAMPLE 17

17β-hydroxy-8α-methyl-17α-propadienylestra-5(10)-en-3-one

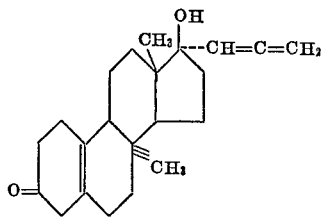

Step A: 3-methoxy-8α-methyl-17α-dimethylamino-propynylestra-2,5(10)-dien-17β-ol

To a solution of 2 g. of lithium metal in 36 ml. of ethylene diamine, there is added dropwise 15 ml. of 3-dimethylamino propynyl. To the reagent thus obtained, a solution of 3.2 g. of 3-methoxy-8α-methylestra-2,5(10)-dien-17-one prepared as described in Step A of Example 14 in 20 ml. of tetrahydrofuran is added dropwise. After 3 hours at room temperature, the product 3-methoxy-8α-methyl - 17α - dimethylaminopropynylestra-2,5(10)-dien-17β-ol is isolated by quenching on ice-water and extracting with chloroform.

Step B: 3-methoxy-8α-methyl-17α-dimethylamino-propynylestra-2,5(10)-dien-17β-ol methiodide The crude product of Step A is dissolved in 40 ml. of acetone. 6 ml. of methyl iodide is added. The crystals separated after 18 hours at 5° are filtered to give 3-methoxy-8α-methyl - 17α - dimethylaminopropynylestra-2,5(10)-dien-17β-ol methiodide.

Step C: 3-methoxy-8α-methyl-17α-propadienyl-estra-2,5(10)-en-3-one

To a solution of 4.2 g. of the product of Step B, in 120 ml. of absolute pyridine, there is added 0.5 g. of lithium aluminum hydride. After 20 minutes at room temperature, water and 5% sodium hydroxide solution is added and the mixture filtered from the separated alumina. The pyridine is stripped off in vacuo, the residue taken up in benzene and washed with water. After drying over Na₂SO₄, the benzene solution is evaporated to give 3-methoxy-8α-methyl-17α-propadienylestra-2,5(10)-dien-17β-ol.

Step D: 17β-hydroxy-8α-methyl-17α-propadienyl-estra-5(10)-en-3-one

Following the procedure of Step B of Example 13, but using an equivalent amount of 3-methoxy-8α-methyl-17α-propadienylestra-2,5(10)-dien-17β-ol in place of the 3-methoxy-8α-methylestra-2,5(10)-dien-17β-ol used therein, there is obtained 17β-hydroxy-8α-methyl-17α-propadienyl-estra-5(10)-en-3-one.

EXAMPLE 18

17β-acetoxy-8α-methylestra-5(10)-en-3-one

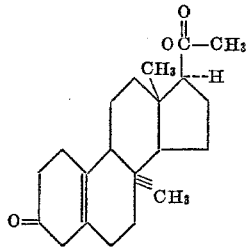

A solution of 350 mg. of 17β-hydroxy-8α-methylestra-5(10)-en-3-one, prepared as described in Step B of Example 13, 0.5 g. of p-toluene sulfonic acid monohydrate and 1.2 g. of acetic anhydride in 10 ml. of pyridine is allowed to stand at 0° for 18 hours and then is poured into ice-water. The crystalline title product separates and is filtered off and purified by recrystallization from ethyl acetate.

When an equivalent amount of

17α-ethyl-17β-hydroxy-8α-methylestra-5(10)-en-3-one;
17α-allyl-17β-hydroxy-8α-methylestra-5(10)-en-3-one;
17α-ethynyl-17β-hydroxy-8α-methylestra-5(10)-en-3-one;
17α-cyclohexyl-17β-hydroxy-8α-methylestra-5(10)-en-3-one;
17α-fluoroethynyl-17β-hydroxy-8α-methylestra-5(10)-en-3-one or
17β-hydroxy-8α-methyl-17α-propadienylestra-5(10)-en-3-one is used in place of 17β-hydroxy-8α-methylestra-5(10)-en-3-one in the above process, there is obtained 17β-acetoxy-17α-ethyl-8α-methylestra-5(10)-en-3-one;
17β-acetoxy-17α-allyl-8α-methylestra-5(10)-en-3-one;
17β-acetoxy-17α-ethynyl-8α-methylestra-5(10)-en-3-one;
17β-acetoxy-17α-cyclohexyl-8α-methylestra-5(10)-en-3-one;
17β-acetoxy-17α-fluoroethynyl-8α-methylestra-5(10)-en-3-one or
17β-acetoxy-8α-methyl-17α-propadienylestra-5(10)-en-3-one, respectively.

EXAMPLE 19

8α-methylestra-5(10)-en-3,17-dione

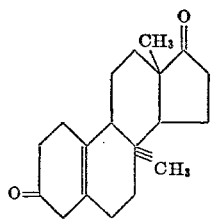

Following the procedure of Example 13, Step B above, but replacing the 3-methoxy-8α-methylestra-2,5(10)-dien-17β-ol used therein with an equivalent amount of 3-methoxy-8α-methylestra-2,5(10)-dien-17-one prepared as described in Step A of Example 14, there is obtained 8α-methylestra-5(10)-en-3,17-dione.

EXAMPLE 20

17β-hydroxy-8α-methylestra-4-en-3-one

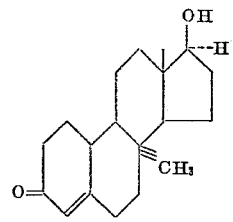

Method A: A solution of 1.0 g. of 17β-hydroxy-8α-methylestra-5(10)-en-3-one prepared as described in Step B of Example 13 above in 80 ml. of methanol is heated, at 40°, with 5 ml. of 5 N aqueous hydrochloric acid. After 30 minutes, ice-water and 1.0 g. of sodium acetate is added, the resulting precipitate is filtered, washed and dried. Recrystallization from methylene dichloride-ether gives 17β-hydroxy-8α-methylestra-4-en-3-one.

Method B: A solution of 1.0 g. of 17β-hydroxy-8α-methylestra-5(10)-en-3-one obtainable as described in Step B of Example 13 above in 10 ml. of methanol is mixed with 10 ml. of aqueous 0.1 normal potassium hydroxide solution and the resulting mixture is refluxed for 1 hour. Following this reaction period, the mixture is poured on water and the resulting precipitate is filtered, washed with water until neutral and then dried. Recrystallization from methylene-dichloride-diethyl ether yields 17β-hydroxy-8α-methylestra-4-en-3-one.

Method C: Repeating the procedure described in Method A above except replacing the 17β-hydroxy-8α-methylestra-5(10)-en-3-one used therein with an equivalent amount of 3-methoxy-8α-methylestra-2,5(10)-dien-17β-ol prepared as described in Step A of Example 13, there is obtained 17β-hydroxy-8α-methylestra-4-en-3-one.

EXAMPLE 21

17α-ethyl-17β-hydroxy-8α-methylestra-4-en-3-one

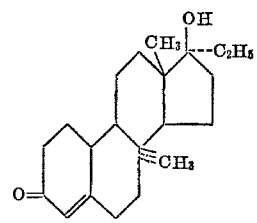

A solution of 1.0 g. of 17α-ethyl-17β-hydroxy-8α-methylestra-5(10)-en-3-one prepared as described in Step B of Example 14 above in 80 ml. of methanol is heated, at 40°, with 5 ml. of 5 N aqueous hydrochloric acid. After 30 minutes, ice-water and 1.0 g. of sodium acetate is added, the resulting precipitate is filtered, washed and dried. Recrystallization from methylene dichloride-ether gives 17α-ethyl-17β-hydroxy-8α-methylestra-4-en-3-one.

When an equivalent amount of

8α-methylestra-5(10)-en-3,17-dione;
17α-allyl-17β-hydroxy-8α-methylestra-5(10)-en-3-one;
17α-ethynyl-17β-hydroxy-8α-methylestra-5(10)-en-3-one;
17α-cyclohexyl-17β-hydroxy-8α-methylestra-5(10)-en-3-one;
17α-fluoroethynyl-17β-hydroxy-8α-methylestra-5(10)-en-3-one; or
17β-hydroxy-8α-methyl-17α-propadienylestra-5(10)-en-3-one is used in place of 17α-ethyl-17β-hydroxy-8α-methylestra-5(10)-en-3-one in the above process, there is obtained 8α-methylestra-4-en-3,17-dione;
17α-allyl-17β-hydroxy-8α-methylestra-4-en-3-one;
17α-ethynyl-17β-hydroxy-8α-methylestra-4-en-3-one;
17α-cyclohexyl-17β-hydroxy-8α-methylestra-4-en-3-one;

17α-fluoroethynyl-17β-hydroxy-8α-methylestra-4-en-3-one;

17β-hydroxy-8α-methyl-17α-propadienylestra-4-en-3-one, respectively.

EXAMPLE 22

17β-acetoxy-17α-ethyl-8α-methylestra-4-en-3-one

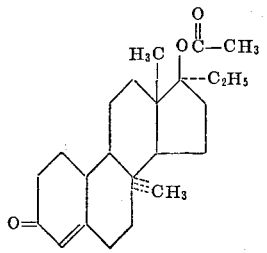

A mixture of 1 g. of 17α-ethyl-17β-hydroxy-8α-methyl-estra-4-en-3-one prepared as described in Example 21, 1.9 g. of p-toluene sulfonic acid monohydrate, 50 ml. of pyridine and 25 ml. acetic anhydride is allowed to stand at room temperature for 24 hours. The reaction mixture is then poured into water and stirred until the excess acetic anhydride is hydrolyzed. The aqueous mixture is then extracted with methylene dichloride, the organic phase separated, water washed, dried over sodium sulfate and evaporated under vacuum to obtain the title product 17β-acetoxy-17α-ethyl-8α-methylestra-4-en-3-one, as residue, which is then refined by crystallization from methanol.

When an equivalent amount of

17β-hydroxy-8α-methylestra-4-en-3-one;
17α-allyl-17β-hydroxy-8α-methylestra-4-en-3-one;
17α-ethynyl-17β-hydroxy-8α-methylestra-4-en-3-one;
17α-cyclohexyl-17β-hydroxy-8α-methylestra-4-en-3-one;
17α-fluoroethynyl-17β-hydroxy-8α-methylestra-4-en-3-one; or
17β-hydroxy-8α-methyl-17α-propadienylestra-4-en-3-one is used in place of 17α-ethyl-17β-hydroxy-8α-methylestra-4-en-3-one in the above process, there is obtained 17β-acetoxy-8α-methylestra-4-en-3-one;
17β-acetoxy-17α-allyl-8α-methylestra-4-en-3-one;
17β-acetoxy-17α-ethynyl-8α-methylestra-4-en-3-one;
17β-acetoxy-17α-cyclohexyl-8α-methylestra-4-en-3-one;
17β-acetoxy-17α-fluoroethynyl-8α-methylestra-4-en-3-one;
17β-acetoxy-8α-methyl-17α-propadienylestra-4-en-3-one, respectively.

EXAMPLE 23

8α-methylestra-4-en-3β,17β-diol

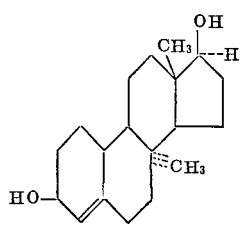

To a mixture containing 3 equivalents of lithium tri-tert-butoxyaluminum hydride in 50 ml. of ether, there is added dropwise 365 mg. of 17β-hydroxy-8α-methylestra-4-en-3-one prepared as described in Step A of Example 20 in 20 ml. of ether at 20° temperature. After 8 hours stirring, methanol is added followed by ice-water extraction with ethyl acetate. The ethyl acetate solution is washed with water, dried over sodium sulfate and upon evaporation yields 8α-methylestra-4-en-3β,17β-diol recrystallized from ethanol.

When an equivalent amount of

17α-ethyl-17β-hydroxy-8α-methylestra-4-en-3-one;
17α-allyl-17β-hydroxy-8α-methylestra-4-en-3-one;
17α-ethynyl-17β-hydroxy-8α-methylestra-4-en-3-one;
17α-cyclohexyl-17β-hydroxy-8α-methylestra-4-en-3-one;
17α-fluoroethynyl-17β-hydroxy-8α-methylestra-4-en-3-one; or
17β-hydroxy-8α-methyl-17α-propadienylestra-4-en-3-one is used in place of 17β-hydroxy-8α-methylestra-4-en-3-one in the above process, there is obtained 17α-ethyl-8α-methylestra-4-en-3β,17β-diol;
17α-allyl-8α-methylestra-4-en-3β,17β-diol;
17α-ethynyl-8α-methylestra-4-en-3β,17β-diol;
17α-cyclohexyl-8α-methylestra-4-en-3β,17β-diol;
17α-fluoroethynyl-8α-methyl-estra-4-en-3β,17β-diol or
8α-methyl-17α-propadienylestra-4-en-3β,17β-diol, respectively.

Following the procedure of Example 9, but using an equivalent amount of

17α-ethyl-8α-methylestra-4-en-3β,17β-diol;
17α-allyl-8α-methylestra-4-en-3β,17β-diol;
17α-ethynyl-8α-methylestra-4-en-3β,17β-diol;
17α-cyclohexyl-8α-methylestra-4-en-3β,17β-diol;
17α-fluoroethynyl-8α-methylestra-4-en-3β,17β-diol; or
17α-propadienylestra-4-en-3β,17β-diol is used in place of 17α-ethyl-8α-methylestra-1,3,5(10)-trien-3,17β-diol used therein, there is obtained 3-acetoxy-17α-ethyl-8α-methylestra-4-en-17β-ol;
3-acetoxy-17α-allyl-8α-methylestra-4-en-17β-ol;
3-acetoxy-17α-ethynyl-8α-methylestra-4-en-17β-ol;
3-acetoxy-17α-cyclohexyl-8α-methylestra-4-en-17β-ol;
3-acetoxy-17α-fluoroethynyl-8α-methylestra-4-en-17β-ol or
3-acetoxy-8α-methyl-17α-propadienylestra-4-en-17β-ol, respectively.

When an equivalent amount of

8α-methylestra-4-en-3β,17β-diol;
17α-ethyl-8α-methylestra-4-en-3β,17β-diol;
17α-allyl-8α-methyletra-4-en-3β,17β-diol;
17α-ethynyl-8α-methylestra-4-en-3β,17β-diol;
17α-cyclohexyl-8α-methylestra-4-en-3β,17β-diol;
17α-fluoroethynyl-8α-methylestra-4-en-3β,17β-diol or
8α-methyl-17α-propadienylestra-4-en-3β,17β-diol is used in place of 17α-ethyl-8α-methylestra-1,3,5(10)-trien-3,17β-diol in the process of Step A of Example 8, there is obtained 3β,17β-diacetoxy-8α-methylestra-4-ene;
3β,17β-diaacetoxy-17α-ethyl-8α-methylestra-4-ene;
3β,17β-diacetoxy-17α-allyl-8α-methylestra-4-ene;
3β,17β-diacetoxy-17α-ethynyl-8α-methylestra-4-ene;
3β,17β-diacetoxy-17α-cyclohexyl-8α-methylestra-4-ene;
3β,17β-diacetoxy-17α-fluoroethynyl-8α-methylestra-4-ene or
3β,17β-diacetoxy-8α-methyl-17α-propadienylestra-4-ene, respectively.

EXAMPLE 24

17β-acetoxy-17α-ethyl-8α-methylestra-3β-ol

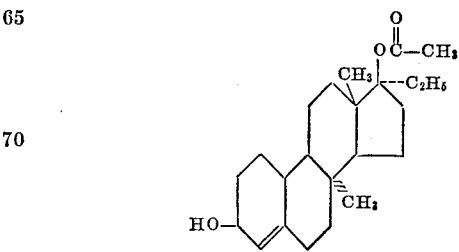

To a mixture containing 3 equivalents of lithium tri-tert-butoxyaluminum hydride in 50 ml. of ether, there is added dropwise 365 mg. of 17β-acetoxy-17α-ethyl-8α-methylestra-4-en-3-one prepared as described in Example 22 in 20 ml. of ether at 20° temperature. After 8 hours stirring, methanol is added followed by ice-water extraction with ethyl acetate. The ethyl acetate solution is washed with water, dried over sodium sulfate and upon evaporation yields 17β-acetoxy-17α-ethyl-8α-methylestra-4-en-3β-ol recrystallized from ethanol.

When an equivalent amount of

17β-acetoxy-8α-methylestra-4-en-3-one;
17β-acetoxy-17α-allyl-8α-methylestra-4-en-3-one;
17β-acetoxy-17α-ethynyl-8α-methylestra-4-en-3-one;
17β-acetoxy-17α-cyclohexyl-8α-methylestra-4-en-3-one;
17β-acetoxy-17α-fluoroethynyl-8α-methylestra-4-en-3-one or
17β-acetoxy-8α-methyl-17α-propadienylestra-4-ene-3-one is used in place of 17β-acetoxy-17α-ethyl-8α-methylestra-4-en-3-one in the above process, there is obtained 17β-acetoxy-8α-methylestra-4-en-3β-ol;
17β-acetoxy-17α-allyl-8α-methylestra-4-en-3β-ol;
17β-acetoxy-17α-ethynyl-8α-methylestra-4-en-3β-ol;
17β-acetoxy-17α-cyclohexyl-8α-methylestra-4-en-3β-ol;
17β-fluoroethynyl-8α-methylestra-4-en-3β-ol or
17β-acetoxy-8α-methyl-17α-propadienylestra-4-en-3β-ol, respectively.

EXAMPLE 25

3β-hydroxy-8α-methylestra-4-en-17-one

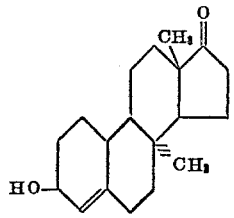

Step A: 8α-methyl-17-tetrahydrofuranyloxyestra-4-en-3-one

To a mixture of 15 ml. of benzene, 3 ml. of dihydrofuran and 1.2 g. of phosphorus oxychloride there is added a benzene (3 ml.) solution of 17β-hydroxy-8α-methylestra-4-en-3-one (0.5 g.) prepared as described in Example 20 above. After 18 hours at room temperature, the mixture is poured over 50 g. of ice containing 5 g. of sodium carbonate; the benzene layer is separated, washed and evaporated to give the product 8α-methyl - 17 - tetrahydrofuranyloxyestra-4-en-3-one, which is then purified by recrystallization from ether.

Step B: 3β-hydroxy-8α-methyl-17-tetrahydrofuranyloxyestra-4-ene

To a mixture containing 3 equivalents of lithium tri-tert-butoxyaluminum hydride in 50 ml. of ether, there is added dropwise 365 mg. of the product from Step A in 20 ml. of ether at 20° temperature. After 8 hours stirring, methanol is added followed by ice-water and extraction with ethyl acetate. The ethyl acetate solution is washed with water, dried over sodium sulfate and upon evaporation yields 3β-hydroxy - 8α - methyl-17-tetrahydrofuranyloxyestra-4-en recrystallized from ethanol.

Step C: 3β-methoxy-8α-methyl-17-tetrahydrofuranyloxyestra-4-ene

A solution of 3β-hydroxy-8α-methyl-17-tetrahydrofuranyloxyestra-4-ene (350 mg.) in boiling tertiary butyl alcohol (20 mg.) is alternately treated with small portions of sodium tert-butoxide and methyl iodide until analytical thin layer chromatography indicates the disappearance of starting material. Water is then added (100 ml.) and the title product removed by filtration. It is purified by chromatography on alumina (Grade 3) using benzene as an eluent.

Step D: 3β-methoxy-8α-methylestra-4-en-17β-ol

A solution of 337 mg. of 3β-methoxy-8α-methyl-17-tetrahydrofuranyloxyestra-4- ene in 14.85 ml. of 80% (v./v.) aqueous acetic acid is kept at 25° for 6 hours. 30 ml. of water is added and the resultant 3β-methoxy-8α-methylestra-4-en-17β-ol is recovered by benzene extraction and crystallization.

Step E: 3β-methoxy-8α-methylestra-4-en-17-one

To a solution of 260 mg. of chromium trioxide in 8 ml. of pyridine, there is added 302 mg. of 3β-methoxy-8α-methylestra-4-en-17β-ol. The mixture is stored 18 hours at room temperature, following which it is poured on ice-water. The crude compound is then extracted with benzene. The extracts are combined and passed through a short column of alumina and the title compound 3β-methoxy-8α-methylestra-4-en-17-one is recovered by evaporation.

Step F: 3β-hydroxy-8α-methylestra-4-en-17-one

An intimate mixture of 2 g. pyridine hydrochloride and 300 mg. of 3β-methoxy-8α-methylestra-4-en-17-one is heated at 180° for 15 minutes. After cooling, water (20 ml.) is added and the product 3β-hydroxy-8α-methylestra-4-en-17-one is extracted with methylene chloride and recovered by evaporation.

EXAMPLE 26

3β-acetoxy-8α-methylestra-4-en-17-one

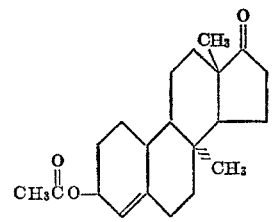

Step A: 3β-acetoxy-8α-methyl-17-tetrahydrofuranyloxyestra-4-ene

A solution of 350 mg. of 3β-hydroxy-8α-methyl-17-tetrahydrofuranyloxyestra-4-ene prepared as described in Step B of Example 25, and 1.2 g. of acetic anhydride in 10 ml. of pyridine is allowed to stand at 0° for 18 hours and then poured on ice-water whereupon the crystalline product 3β-acetoxy-8α-methyl - 17 - tetrahydrofuranyloxyestra-4-ene is filtered off and purified by recrystallization from ethyl acetate.

Step B: 3β-acetoxy-8α-methylestra-4-en-17β-ol

A solution of 337 mg. of 3β-acetoxy-8α-methyl-17-tetrahydrofuranyloxyestra-4-ene in 14.85 ml. of 80% (v./v.) aqueous acetic acid is kept at 25° for 6 hours. 30 ml. of water is added and the resultant 3β-acetoxy-8α-methylestra-4-en-17β-ol is recovered by benzene extraction and crystallization.

Step C: 3β-acetoxy-8α-methylestra-4-en-17-one

To a solution of 260 mg. of chromium trioxide in 8 ml. of pyridine, there is added 302 mg. of 3β-acetoxy-8α-methylestra-4-en-17β-ol. The mixture is stored 18 hours at room temperature, following which it is poured on ice-water. The crude compound is then extracted with benzene. The extracts are combined and passed through a short column of alumina and the product 3β-acetoxy-8α-methylestra-4-en-17-one is recovered by evaporation.

EXAMPLE 27

17α-ethyl-3β-methoxy-8α-methylestra-4-en-17β-ol

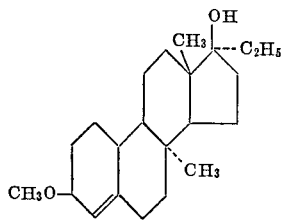

To a Grignard mixture prepared from 0.52 g. of magnesium and 2.1 ml. of ethyl bromide in 20 ml. of anhydrous tetrahydrofuran, there is added dropwise at 60° C. a solution of 425 mg. of 3β-methoxy-8α-methylestra-4-en-17-one in 8 ml. of tetrahydrofuran prepared as described in Step E of Example 25. Under nitrogen atmosphere, the mixture is refluxed for 5 hours, then cooled, decomposed by the addition of 15 ml. of saturated ammonium chloride solution and extracted with chloroform. The product 17α-ethyl-3β-methoxy-8α-methylestra-4-en-17β-ol is obtained by the evaporation of the dried and washed ($H_2O$) chloroform solution and is purified by recrystallization from ethanol.

When an equivalent amount of allyl bromide is substituted for ethyl bromide in the process of this example, there is obtained 17α-allyl-3β-methoxy-8α-methylestra-4-en-17β-ol.

EXAMPLE 28

17α-ethynyl-3β-methoxy-8α-methylestra-4-en-17β-ol

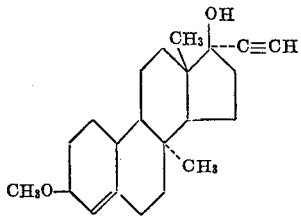

To a mixture of 2.1 g. of lithium acetylide-ethylenediamine complex in 15 ml. of anhydrous dimethyl acetamide, there is added 825 mg. of 3β-methoxy-8α-methylestra-4-en-17-one prepared as described in Step E of Example 25. After 2 hours at 20°, the mixture is poured onto 100 ml. of 2 N hydrochloric acid. The title product which separates as a solid, is removed by filtration and purified by recrystallization from ethyl acetate-hexane.

When an equivalent amount of cyclohexyl lithium is used in place of lithium acetylide in the process of this example, there is obtained 17α-cyclohexyl-3β-methoxy-8α-methylestra-4-en-17β-ol.

EXAMPLE 29

17α-fluoroethynyl-3β-methoxy-8α-methylestra-4-en-17β-ol

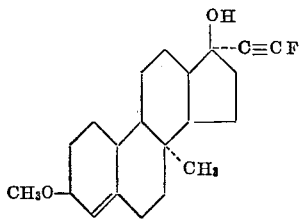

A solution of 8.5 grams of 1-chloro-2-fluoroethylene in 50 cc. of anhydrous diethyl ether is added dropwise with stirring, at 0° C. over a half hour period, to 15 cc. of a 1.4 N solution of methyl lithium in anhydrous diethyl ether, maintained under an inert nitrogen atmosphere. The mixture is then held at room temperature, with stirring, for an additional 90 minutes.

A solution of 0.5 gram of 3β-methoxy-8α-methylestra-4-en-17-one prepared as described in Step E of Example 25 in 20 cc. of anhydrous diethyl ether is then added dropwise, with stirring, over a 15 minute period, following which the resulting reaction mixture is held at room temperature, with stirring, for 18 hours. Following this reaction period, the reaction mixture is poured into ice-water and then extracted with diethyl ether. The combined ether extracts are washed with water, dried over anhydrous sodium sulfate and then concentrated under vacuum. Chromatography of the residue on basic alumina, using petroleum ether/diethyl ether (8:2, respectively, by volume) as the eluant, followed by crystallization from methanol, yields 17α-fluoroethynyl-3-methoxy-8α-methylestra-4-en-17β-ol.

EXAMPLE 30

3β-methoxy-8α-methyl-17α-propadienylestra-4-en-17β-ol

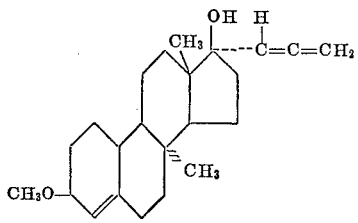

Step A: 3β-methoxy-8α-methyl-17α-dimethyl-aminopropynylestra-4-en-17β-ol

To a solution of 2 g. of lithium metal in 36 ml. of ethylene diamine, there is added dropwise 15 ml. of 3-dimethylamino propynyl. To the reagent thus obtained a solution of 3.2 g. of 3-methoxy-8α-methylestra-4-en-17-one prepared as described in Step E of Example 25 in 20 ml. of tetrahydrofuran is added dropwise. After 3 hours at room temperature, the product 3β-methoxy-8α-methyl-17α - dimethylaminopropynylestra-4-en-17β-ol is isolated by quenching on ice-water and extracting with chloroform.

Step B: 3β-methoxy-8α-methyl-17α-dimethylamino-propynylestra-4-en-17β-ol methiodide The crude title product of Step A is dissolved in 40 ml. of acetone and 6 ml. of methyl iodide is added. The crystals separated after 18 hours at 5° are filtered to give the product 3β - methoxy-8α-methyl-17α-dimethylamino-propynylestra-4-en-17β-ol methiodide.

Step C: 3β-methoxy-8α-methyl-17α-propadienyl-estra-4-en-17β-ol

To a solution of 30 g. of the product of Step B, in 120 ml. of absolute pyridine, there is added 0.5 g. of lithium aluminum hydride. After 20 minutes at room temperature, water and 5% sodium hydroxide solution are added and the mixture filtered from the separated alumina. The pyridine is stripped off in vacuo, and the residue take up in benzene and washed with water. After drying over sodium sulfate, the benzene solution is evaporated to give the 3β-methoxy-8α-methyl - 17α - propadienylestra-4-en-17β-ol.

EXAMPLE 31

17β-acetoxy-17α-ethyl-3β-methoxy-8α-methylestra-4-ene

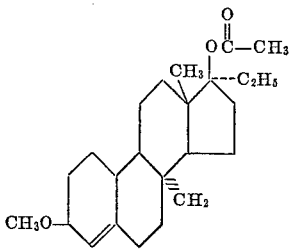

1 g. of 17α-ethyl-3β-methoxy-8α-methylestra-4-en-17β-ol prepared as described in Example 27, 1 g. of p-toluene sulfonic acid monohydrate, 50 ml. of acetic acid and 25 ml. acetic anhydride are allowed to stand at room temperature for 24 hours. The reaction mixture is then poured into water and stirred until the excess acetic anhydride is hydrolyzed. The aqueous mixture is then extracted with methylene dichloride and the organic phase is separated, water washed, dried over sodium sulfate and evaporated under vacuum to obtain the product 17β-acetoxy-17α-ethyl-3β-methoxy-8α-methylestra-4-ene as residue, which is then refined by crystallization from methanol.

When equivalent amounts of

3β-methoxy-8α-methylestra-4-en-17β-ol;
17α-allyl-3β-methoxy-8α-methylestra-4-en-17β-ol;
17α-ethynyl-3β-methoxy-8α-methylestra-4-en-17β-ol;
17α-cyclohexyl-3β-methoxy-8α-methylestra-4-en-17β-ol;
17α-fluoroethynyl-3β-methoxy-8α-methylestra-4-en-17β-ol or
3β-methoxy-8α-methyl-17α-propadienylestra-4-en-17β-ol is used in place of 17α-ethyl-3β-methoxy-8α-methylestra-4-en-17β-ol in the above process, there is obtained 17β-acetoxy-3β-methoxy-8α-methylestra-4-ene;
17β-acetoxy-17α-allyl-3β-methoxy-8α-methylestra-4-ene;
17β-acetoxy-17α-ethynyl-3β-methoxy-8α-methylestra-4-ene;
17β-acetoxy-17α-cyclohexyl-3β-methoxy-8α-methylestra-4-ene;
17β-acetoxy-17α-fluoroethynyl-3β-methoxy-8α-methylestra-4-ene or
17β-acetoxy-3β-methoxy-8α-methyl-17α-propadienylestra-4-ene, respectively.

EXAMPLE 32

13β-ethyl-3-methoxy-8α-methylgona-1,3,5(10)-trien-17-one

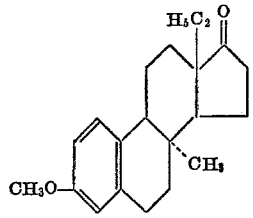

Following the procedure of Steps A, B, C, D, E, F and G of Example 1, but using an equivalent amount of 13-ethyl-17-ethylenedioxy-3-methoxygona-1,3,5(10),6-tetraene in place of the 17-ethylenedioxy-3-methoxyestra-1,3,5(10) 6-tetraene used therein, there is obtained 13β-ethyl-3-methoxy-8α-methylgona-1,3,5(10)-trien-17-one.

EXAMPLE 33

13β-ethyl-8α-methyl-17β-hydroxy-17α-propadienylgona-5(10)-en-3-one

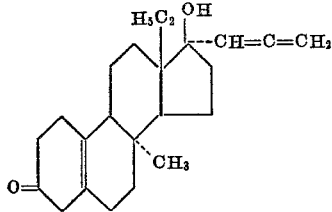

Step A: 13β-ethyl-3-methoxy-8α-methylgona-2,5(10)-dien-17β-ol

Following the procedure of Step A of Example 13, but using an equivalent amount of 13-ethyl-3-methoxy-8α-methylgona-1,3,5(10)-trien-17-one in place of the 3-methoxy-8α-methylestra-1,3,5(10)-trien-17β-ol used therein, there is obtained 13-ethyl-3-methoxy-8α-methylgona-2,5(10)-dien-17β-ol.

Step B: 13β-ethyl-3-methoxy-8α-methylgona-2,5(10)-dien-17β-one

Following the procedure of Step G of Example 1, but replacing the 3-methoxy-8α-methylestra-1,3,5(10)-trien-17β-ol used therein with 13β-ethyl-3-methoxy-8α-methylgona-2,5(10)-dien-17β-ol, there is obtained 13β-ethyl-3-methoxy-8α-methylgona-2,5(10)-dien-17β-one.

Step C: 13β-ethyl-3-methoxy-8α-methyl-17α-propadienylgona-2,5(10)-dien-17β-ol

Following the procedures of Step A, B, and C of Example 7 but using an equivalent amount of 13β-ethyl-3-methoxy-8α-methylgona-2,5(10)-dien-17β-one in place of the 3-methoxy-8α-methylestra-1,3,5(10)-trien-17-one used therein, there is obtained 13β-ethyl-3-methoxy-8α-methyl-17α-propadienylgona-2,5(10)-dien-17β-ol.

Step D: 13β-ethyl-8α-methyl-17β-hydroxy-17α-propadienylgona-5(10)-en-3-one

Following the procedure of Step B of Example 13, but using 13β-ethyl-3-methoxy-8α-methyl-17α-propadienylgona-2,5(10)-dien-17β-ol in place of the 3-methoxy-8α-methylestra-2,5(10)-dien-17β-ol used therein, there is obtained 13β-ethyl-8α-methyl-17β-hydroxy-17α-propadienylgona-5(10)-en-3-one.

EXAMPLE 34

13β-ethyl-8α-methyl-17β-hydroxy-17α-propadienylgona-4-en-3-one

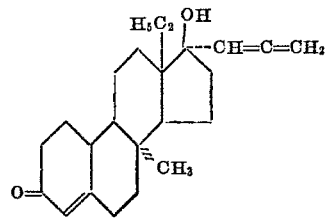

Following the procedure of Method A of Example 20, but using an equivalent amount of 13β-ethyl-8α-methyl-17β-hydroxy-17α-propadienylgona-5(10)-en-3-one in place of the 17β-hydroxy-8α-methylestra-5(10)-en-3-one used therein, there is obtained 13β-ethyl-8α-methyl-17β-hydroxy-17α-propadienylgona-4-en-3-one.

EXAMPLE 35

3,17β-ditetrahydrofuranyloxy-dicyclo[6,7a,7,8]-B-homoestra-1,3,5(10)-triene

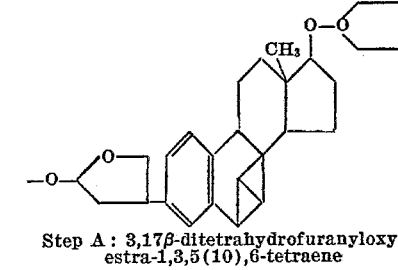

Step A: 3,17β-ditetrahydrofuranyloxyestra-1,3,5(10),6-tetraene

To a mixture of 150 ml. of benzene, 30 ml. of dihydrofuran and 12 g. of phosphorus oxychloride there is added a benzene (30 ml.) solution of estra-1,3,5(10),6-tetraene-3,17β-diol(10 g.). After 18 hours at room temperature, the mixture is poured over 50 g. of ice containing 5 g. of sodium carbonate; the benzene layer is separated, washed and evaporated to give the product 3,17β-ditetrahydrofuranyloxyestra-1,3,5(10),6-tetraene which is then purified by recrystallization from ether.

Step B: 3,17β-ditetrafuranyloxy-dicyclo[6,7a,7,8]-B-homoestra-1,3,5(10)-triene

Following the procedures of Step A and B of Example 1, but using an equivalent amount of 3,17β-ditetrahydrofuranyloxyestra-13,5(10),6-tetraene in place of the 17-ethylenedioxy-3-methoxyestra - 1,3,5(10),6 - tetraene used in Step A, there is obtained 3,17β-ditetrahydrofuranyloxy-dicyclo[6,7a,7,8]-B - homoestra - 1,3,5(10)-triene.

When 3,17β-ditetrahydrofuranyloxy-dicyclo[6,7a,7,8]-B-homoestra-1,3,5(10)-triene is substituted for the 17-ethylenedioxy-3-methoxy-dicyclo[6,7a,7,8]-B - homoestra-1,3,5(10)-triene used in Step C of Example 1, there is obtained 3,17β-ditetrahydrofuranyloxy-8α-methylestra - 1,3,5 (10),6-tetraene.

Following the procedures of Steps D, E and F of Example 1, but using an equivalent amount of 3,17β-ditetrahydrofuranyloxy-8α-methylestra-1,3,5(10),6 - tetraene in place of the 17-ethylenedioxy-3-methoxy-8α-methylestra-1,3,5(10),6-tetraene used in Step D, there is obtained 8α-methylestra-1,3,5(10)-trien-3,17β-diol.

When an equivalent amount of 8α-methylestra-1,3,5(10)-trien-3,17β-diol is used in place of 17α-ethyl-8α-methylestra-1,3,5(10)-trien-3,17β-diol in the process of Step A of Example 8, there is obtained 3,17β-diacetoxy-8α-methylestra-1,3,5(10)-triene.

EXAMPLE 36

17α-ethyl-3,17β-ditetrahydropyranyloxy-dicyclo[6,7a,7,8]-B-homoestra-1,3,5(10)-triene

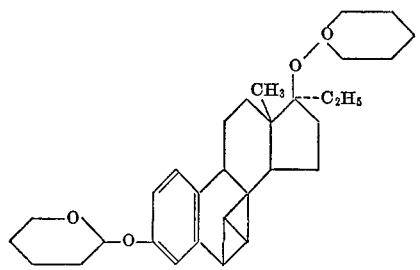

Step A: 17α-ethyl-estra-1,3,5(10),6-tetraene-3,17β-diol

To a Grignard mixture prepared from 25 g. of magnesium and 100 ml. of ethyl bromide in 500 ml. of anhydrous tetrahydrofuran, is added dropwise at 60°, a solution of 20 g. of 3-hydroxy-estra-1,3,5(10),6-tetraene-17-one in 18 ml. of tetrahydrofuran. Under nitrogen atomsphere, the mixture is refluxed for 5 hours, then cooled, decomposed with the addition of 400 ml. of saturated ammonium chloride solution and extracted with chloroform. The product 17α-ethyl-estra-1,3,5(10),6-tetraene-3,17β-diol is obtained on the evaporation of the dried and washed ($H_2O$) chloroform solution and is purified by recrystallization from ethanol.

Step B: 17α-ethyl-3,17β-ditetrahydropyranyloxy-estra-1,3,5(10),6-tetraene

To a mixture of 150 ml. of benzene, 30 ml. of dihydrofuran and 12 g. of phosphorus oxychloride there is added a benzene (30 ml.) solution of 17α-ethyl-estra-1,3,5(10),6-tetraene-3,17β-diol (10 g.). After 18 hours at room temperature, the mixture is poured over 50 g. of ice containing 5 g. of sodium carbonate; the benzene layer is separated, washed and evaporated to give the product 17α-ethyl-3,17β - ditetrahydropyranyloxyestra - 1,3,5(10),6-tetraene which is then purified by recrystallization from ether.

Step C: 17α-ethyl-3,17β-ditetrahydropyranyloxy-dicyclo [6,7a,7,8]-B-homoestra-1,3,5(10)-triene Following the procedures of Step A and B of Example 1, but using an equivalent amount of 17α-ethyl-3,17β-ditetrahydropyranyloxyestra-1,3,5(10),6-tetraene in place of the 17-ethylenedioxy-3 - methoxyestra - 1,3,5(10),6-tetraene used in Step A, there is obtained 17α-ethyl-3,17β-ditetrahydropyranyloxy-dicyclo[6,7a,7,8]-B - homoestra-1,3,5(10)-triene.

When 17α-ethyl-3,17β-ditetrahydropyranyloxy - dicyclo [6,7a,7,8]-B-homoestra-1,3,5(10)-triene is substituted for the 17-ethylenedioxy-3 - methoxy-dicyclo[6,7a,7,8] - B-homoestra-1,3,5(10)-triene used in Step C of Example 1, there is obtained 17α-ethyl-3,17β-ditetrahydropyranyloxy-8α-methylestra-1,3,5(10),6-tetraene.

Following the procedures of Steps D, E, and F of Example 1, but using an equivalent amount of 17α-ethyl-3,17β-ditetrahydropyranyloxy-8α-methylestra - 1,3,5(10),6-tetraene in place of the 17-ethylenedioxy-3-methoxy-8α-methylestra-1,3,5(10),6-tetraene used in Step D, there is obtained 17α-ethyl-8α-methylestra-1,3,5(10)-trien-3,17β-diol.

EXAMPLE 37

17α-cyclohexyl-3,17β-ditetrahydrofuranyloxy-dicyclo [6,7a,7,8]-B-homoestra-1,3,5(10)-triene

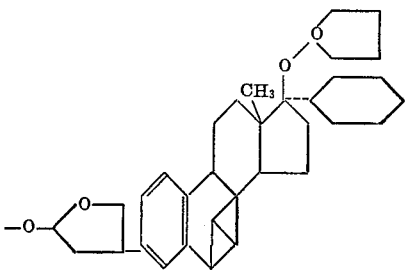

Step A: 17α-cyclohexyl-estra-1,3,5(10),6-tetraene-3,17β-diol

To a mixture of 25 g. of cyclohexyl lithium-ethylenediamine complex in 150 ml. of anhydrous dimethyl acetamide, there is added 15 g. of 3-hydroxy-estra-1,3,5(10),6-tetraene-17-one. After 2 hours at 20°, the mixture is poured onto 1000 ml. of 2 N hydrochloric acid. The product 17α-cyclohexylestra-1,3,5(10),6-tetraene - 3,17β - diol which separates as a solid, is removed by filtration and purified by recrystallization from ethyl acetate-hexane.

Step B: 17α-cyclohexyl-3,17β-ditetrahydrofuranyloxyestra-1,3,5(10),6-tetraene

To a mixture of 150 ml. of benzene, 30 ml. of dihydrofuran and 12 g. of phosphorus oxychloride there is added a benzene (30 ml.) solution of 17α-cyclohexyl-estra-1,3,5(10),6-tetraene-3,17β-diol(10 g.). After 18 hours at room temperature, the mixture is poured over 50 g. of ice containing 5 g. of sodium carbonate; the benzene layer is separated, washed and evaporated to give the product 17α-cyclohexyl - 3,17β - ditetrahydrofuranyloxy-estra-1,3,5(10),6-tetraene which is then purified by recrystallization from ether.

Step C: 17α-cyclohexyl-3,17β-ditetrahydrofuranyloxy-dicyclo-[6,7a,7,8]-B-homoestra-1,3,5(10)-triene Following the procedures of Steps A and B of Example 1, but using an equivalent amount of 17α-cyclohexyl-3,17β-ditetrahydrofuranyloxyestra-1,3,5(10),6-tetraene in place of the 17-ethylenedioxy-3-methoxyestra-1,3,5(10),6-tetraene used in Step A, there is obtained 17α-cyclohexyl-3,17β - ditetrahydrofuranyloxy - dicyclo - [6,7a,7,8] - B-homoestra-1,3,5(10)-triene.

When 17α - cyclohexyl - 3,17β - ditetrahydrofuranyloxy - dicyclo[6,7a,7,8]-B-homoestra - 1,3,5(10) - triene is substituted for the 17 - ethylene - 3 - methoxy-dicyclo-[6,7a,7,8]-B-homoestra-1,3,5(10)-triene used in Step C of Example 1, there is obtained 17α-cyclohexyl-3,17β-ditetrahydrofuranyloxy - 8α - methylestra - 1,3,5(10),6-tetraene.

Following the procedures of Steps D, E, and F of Example 1, but using an equivalent amount of 17α-cyclohexyl - 3,17β - ditetrahydrofuranyloxy - 8α - methylestra-1,3,5(10),6-tetraene in place of the 17-ethylenedioxy-3-methoxy-8α-methylestra-1,3,5(10),6-tetraene used in Step D, there is obtained 17α - cyclohexyl - 8α - methylestra-1,3,5(10)-triene-3,17β-diol.

What is claimed is:

1. A compound of the formula

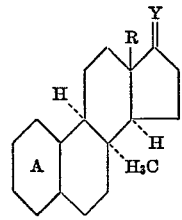

where

R is alkyl having 1 to 3 carbon atoms;

Y is the function

wherein
R¹ is a hydrogen atom or acyl having from 2 to 4 carbon atoms; and
Q is propadienyl; and Ring A is a member of the group consisting of the A structures:

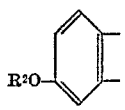 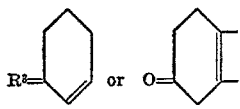

wherein
R² is a hydrogen atom, alkyl having from 1 to 4 carbon atoms or acyl having from 2 to 4 carbon atoms; and
R³ is oxo or the group

where R² is as defined above.

2. The compound of claim 1 which is 3-methoxy-8α-methyl-17α-propadienylestra-1,3,5(10)-trien-17β-ol.

3. The compound of claim 1 which is 13β-ethyl-3-methoxy - 8α - methyl - 17α - propadienylgona-1,3,5(10)-trien-17β-ol.

4. The compound of claim 1 which is 17β-hydroxy-8α-methyl-17α-propadienylestra-5(10)en-3-one.

5. The compound of claim 1 which is 17β-hydroxy-8α-methyl-17α-propadienylestra-4-en-3-one.

6. A process for the preparation of a compound of the formula

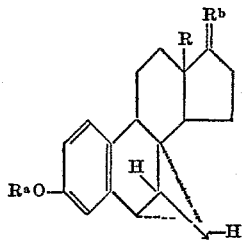

wherein
R is alkyl having from 1 to 3 carbon atoms;
Rᵃ is alkyl having from 1 to 4 carbon atoms, tetrahydrofuran-2-yl, or tetrahyropyran-2-yl; and
Rᵇ is ethylenedioxy, or

wherein
Rᶜ is tetrahydropyran-2-yl or tetrahydrofuran-2-yl; and
Rᵈ is a hydrogen atom, alkyl having from 1 to 4 carbon atoms, or cycloalkyl having from 5 to 7 ring carbon atoms, which comprises reacting a compound of the formula

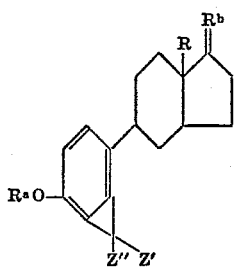

wherein
each of R, Rᵃ and Rᵇ is as defined above; and each of Z′ and Z″ is independently halo having an atomic weight of from 35 to 80; with an alkyl-lithium having from 1 to 6 carbon atoms in the alkyl moiety, in an aprotic inert solvent at a temperature of from about −60° to about +30° C.

7. A process for the preparation of a compound of the formula

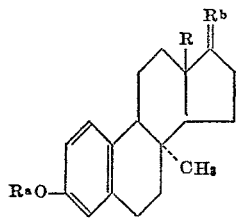

wherein R, Rᵃ and Rᵇ are as defined in claim 6, which comprises reacting a compound of the formula

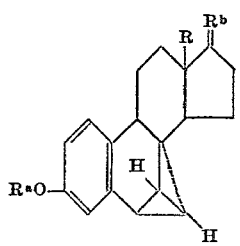

with hydrogen in the presence of a palladium catalyst on an inert carrier under hydrogenation conditions.

8. A process for preparing a compound of the formula

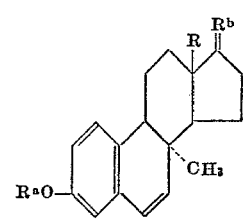

wherein R, Rᵃ and Rᵇ are as defined in claim 6 which comprises reacting a compound of the formula

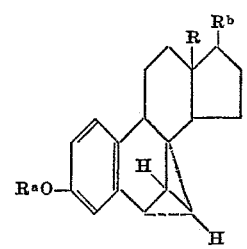

with hydrogen in an inert aprotic solvent in the presence of a palladium catalyst at a temperature of from about −20 to 30° C. and at a pressure of about 1 atmosphere.

9. A compound of the formula

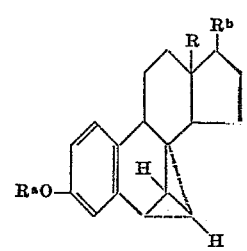

wherein R, Rᵃ and Rᵇ are as defined in claim 6.

10. A compound of the formula
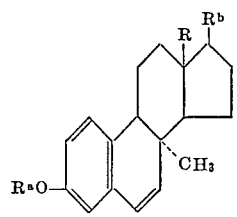
where R, R$^a$, R$^b$ is as defined in claim 9.
11. The compound of claim 10 which is 17-ethylenedioxy-3-methoxy-8α-methylestra-1,3,5(10),6-tetraene.
12. The compound of claim 10 which is 17-ethylenedioxy - 3 - methoxy-dicyclo[6,7a,7,8] - B - homoestra-1,3,5(10)-triene.
References Cited
UNITED STATES PATENTS
| | | | |
|---|---|---|---|
| 3,382,258 | 5/1968 | Diassi et al. | 260—397.3 |
| 3,551,459 | 12/1970 | Hughes et al. | 260—397.4 |
| 3,541,210 | 11/1970 | Galantay. | |
ELBERT L. ROBERTS, Primary Examiner
U.S. Cl. X.R.
260—340.5, 397.3, 397.45, 397.5